US012326507B2

(12) United States Patent
Fischer et al.

(10) Patent No.: US 12,326,507 B2
(45) Date of Patent: Jun. 10, 2025

(54) SYSTEMS AND METHODS FOR SUPPORT OF ON-DEMAND POSITIONING REFERENCE SIGNALS IN A WIRELESS NETWORK

(71) Applicant: QUALCOMM Incorporated, San Diego, CA (US)

(72) Inventors: Sven Fischer, Nuremberg (DE); Stephen William Edge, Escondido, CA (US); Sony Akkarakaran, Poway, CA (US); Alexandros Manolakos, Escondido, CA (US); Guttorm Ringstad Opshaug, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 202 days.

(21) Appl. No.: 17/483,320

(22) Filed: Sep. 23, 2021

(65) Prior Publication Data

US 2022/0120841 A1    Apr. 21, 2022

Related U.S. Application Data

(60) Provisional application No. 63/092,996, filed on Oct. 16, 2020.

(51) Int. Cl.
*H04W 80/02* (2009.01)
*G01S 5/00* (2006.01)
(Continued)

(52) U.S. Cl.
CPC .......... *G01S 5/0036* (2013.01); *H04L 5/0051* (2013.01); *H04W 24/10* (2013.01); *H04W 80/02* (2013.01)

(58) Field of Classification Search
CPC ............. H04L 43/0865; H04L 5/0048; H04W 54/006; H04W 54/00; H04W 24/10;
(Continued)

(56) References Cited

U.S. PATENT DOCUMENTS 6,990,140 B2    1/2006  Loomis et al.
11,126,356 B2 *  9/2021  Van Duyne ........... H04L 9/0618
(Continued)

FOREIGN PATENT DOCUMENTS

WO    WO-2020092715 A1 *  5/2020  ........... H04L 5/0048

OTHER PUBLICATIONS

S. Dwivedi et al., "Positioning in 5G Networks," in IEEE Communications Magazine, vol. 59, No. 11, pp. 38-44, Nov. 2021, doi: 10.1109/MCOM.011.2100091. (Year: 2021).*
(Continued)

*Primary Examiner* — William D Cumming
(74) *Attorney, Agent, or Firm* — QUALCOMM Incorporated

(57) ABSTRACT

Techniques are provided for enabling on-demand positioning reference signals (PRS) with a user equipment (UE). An example method for determining a location of a mobile device includes sending a request for downlink positioning reference signals to a network server, where the request includes positioning reference signal configuration information, receiving assistance data based on the positioning reference signal configuration information, measuring one or more downlink positioning reference signals based at least in part on the positioning reference signal configuration information, and determining a location of the mobile device based at least on part on the measurements obtained from the one or more downlink positioning reference signals and the assistance data.

93 Claims, 18 Drawing Sheets

(51) Int. Cl.
*H04L 5/00* (2006.01)
*H04W 24/10* (2009.01)

(58) Field of Classification Search
CPC ..... H04W 4/02; H04W 64/006; H04W 64/00; H04W 12/041; H04W 24/08; H04W 52/028
See application file for complete search history.

(56) References Cited

U.S. PATENT DOCUMENTS

| | | | |
|---|---|---|---|
| 11,445,334 B1 | 9/2022 | Bao | |
| 11,700,507 B2 | 7/2023 | Bao et al. | |
| 12,003,977 B2* | 6/2024 | Bao | H04W 64/006 |
| 12,047,810 B2* | 7/2024 | Kumar | G01S 5/0205 |
| 2018/0284149 A1 | 10/2018 | Kommi et al. | |
| 2019/0074946 A1 | 3/2019 | Xue et al. | |
| 2019/0082288 A1 | 3/2019 | Kumar et al. | |
| 2020/0028648 A1 | 1/2020 | Akkarakaran et al. | |
| 2020/0092715 A1* | 3/2020 | Van Duyne | H04W 12/041 |
| 2020/0137715 A1* | 4/2020 | Edge | H04W 64/00 |
| 2020/0187145 A1 | 6/2020 | Chae et al. | |
| 2021/0144735 A1* | 5/2021 | Manolakos | H04W 24/08 |
| 2021/0329417 A1 | 10/2021 | Priyanto et al. | |
| 2021/0356581 A1* | 11/2021 | Keating | H04B 7/0619 |
| 2021/0377906 A1* | 12/2021 | Bao | H04W 24/10 |
| 2022/0038927 A1* | 2/2022 | Manolakos | G01S 5/0221 |
| 2022/0046444 A1* | 2/2022 | Manolakos | H04L 5/0091 |
| 2022/0053424 A1* | 2/2022 | Bao | H04W 52/028 |
| 2022/0120841 A1* | 4/2022 | Fischer | H04L 5/0051 |
| 2022/0244344 A1* | 8/2022 | Bao | H04W 64/00 |
| 2022/0248366 A1* | 8/2022 | Bao | H04W 64/006 |
| 2022/0256356 A1* | 8/2022 | Bao | H04W 64/006 |
| 2023/0098778 A1* | 3/2023 | Kumar | H04W 28/06 455/456.5 |
| 2023/0101737 A1* | 3/2023 | Bao | H04B 17/27 455/456.1 |
| 2023/0299923 A1 | 9/2023 | Yoon et al. | |
| 2023/0300571 A1 | 9/2023 | Bao | |
| 2023/0309042 A1* | 9/2023 | Da | G01S 19/32 |
| 2023/0309049 A1* | 9/2023 | Ren | H04W 52/0254 |
| 2024/0259985 A1* | 8/2024 | Ren | G01S 5/0236 |
| 2025/0008472 A1* | 1/2025 | Duan | H04W 52/0216 |
| 2025/0024413 A1* | 1/2025 | Khoshkholgh Dashtaki | H04L 67/34 |

OTHER PUBLICATIONS

International Search Report and Written Opinion—PCT/US2021/051863—ISA/EPO—May 1, 2022.
Qualcomm Incorporated: "Combined Downlink and Uplink NR Positioning Procedures", 3GPP TSG-RAN WG2 Meeting #104, R2-1817899, 3rd Generation Partnership Project, Mobile Competence Centre, 650, Route Des Lucioles, F-06921 Sophia-Antipolis Cedex, France, vol. RAN WG2, No. Spokane, USA, Nov. 12-Nov. 16, 2018, Nov. 12, 2018, XP051481785, pp. 1-18, Para 0001-0003, p. 4, Figures 1-5, Figure 4.
Qualcomm Incorporated: "On-Demand Prs", 3GPP TSG-RAN WG2 Meeting #112-e, R2-2010097, 3rd Generation Partnership Project, Mobile Competence Centre, 650, Route Des Lucioles, F-06921 Sophia-Antipolis Cedex, France, vol. RAN WG2, No. Electronic, Nov. 2-Nov. 13, 2020, Oct. 23, 2020, XP051942802, 12 Pages.
Spreadtrum Communications: "Discussion on the Enhancements of on-Demand PRS", 3GPP TSG-RAN WG2 Meeting #113bis-e, R2-2103250, 3rd Generation Partnership Project, Mobile Competence Centre, 650, Route Des Lucioles, F-06921 Sophia-Antipolis Cedex, France, vol. RAN WG2, No. Online, Apr. 12-Apr. 20, 2021, Apr. 2, 2021, XP052174848, 2 Pages, Item [2].

\* cited by examiner

SYSTEMS AND METHODS FOR SUPPORT OF ON-DEMAND POSITIONING REFERENCE SIGNALS IN A WIRELESS NETWORK

CROSS-REFERENCE TO RELATED APPLICATION

This application claims the benefit of U.S. Provisional Application No. 63/092,996, filed Oct. 16, 2020, entitled "ON-DEMAND POSITIONING REFERENCE SIGNALS," which is assigned to assignee hereof, and the entire contents of which are hereby incorporated by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

Obtaining the location (also referred to as a "position") of a mobile device that is accessing a wireless network may be useful for many applications including, for example, emergency calls, personal navigation, consumer asset tracking, locating a friend or family member, etc. Existing positioning methods include methods based on measuring radio signals transmitted from a variety of devices including space vehicles and terrestrial radio sources in a wireless network such as base stations and access points. Base stations in a wireless network may be configured to transmit reference signals to enable a mobile device to perform positioning measurements. Improvements in position related signaling may improve the accuracy, latency and/or efficiency of locating a mobile device.

SUMMARY

An example method for determining a location of a mobile device according to the disclosure includes sending a request for downlink positioning reference signals to a network server, wherein the request includes positioning reference signal configuration information, receiving assistance data based on the positioning reference signal configuration information, measuring one or more downlink positioning reference signals based at least in part on the positioning reference signal configuration information, and determining the location based at least on part on the measurements obtained from the one or more downlink positioning reference signals and the assistance data.

Implementations of such a method may include one or more of the following features. The request for the downlink positioning reference signals may be a Mobile-Originated Location Request (MO-LR). The request for the downlink positioning reference signals may be a Radio Resource Control (RRC) Dedicated System Information Block (SIB) request. The positioning reference signal configuration information may include at least one of a quality of service indicator, a time duration indicating how long the requested downlink positioning reference signals are required by the mobile device, and Reference Signal Received Power (RSRP) measurements of downlink signals received by the mobile device. A Mobile-Originated Location Request (MO-LR) response message indicating a time start and a duration for the one or more downlink positioning reference signals may be received. Receiving the assistance data may include receiving a Radio Resource Control (RRC) Reconfiguration message. Receiving the assistance data may include receiving a LPP Provide Assistance Data message. The positioning reference signal configuration information may be associated with one or more positioning reference signal resources in a positioning frequency layer.

An example method for providing location information to a mobile device according to the disclosure includes receiving a request for downlink positioning reference signals, wherein the request includes positioning reference signal configuration information, determining one or more base stations to provide the downlink positioning reference signals based on the positioning reference signal configuration information, providing the positioning reference signal configuration information to the one or more base stations, and providing assistance data based on the positioning reference signal configuration information.

Implementations of such a method may include one or more of the following features. The request for the downlink positioning reference signals may be based on a Mobile-Originated Location Request (MO-LR) received by a network server. The request for the downlink positioning reference signals may be based on a Radio Resource Control (RRC) Dedicated System Information Block (SIB) request received by a network base station. The positioning reference signal configuration information may include at least one of a quality of service indicator, a time duration indicating how long the requested downlink positioning reference signals are required by the mobile device, and RSRP measurements of downlink signals received by the mobile device. A response message indicating a time start and a duration for the one or more downlink positioning reference signals may be provided. Determining one or more base stations to provide the downlink positioning reference signals may include selecting one or more positioning reference signal resources from a positioning frequency layer. Determining one or more base stations to provide the downlink positioning reference signals may include selecting one or more downlink positioning reference signal beams based on an approximate location of the mobile device. The approximate location of the mobile device may be based on at least one of a coverage area of a serving cell for the mobile device, Reference Signal Received Power (RSRP) measurements of downlink signals received by the mobile device, and Enhanced Cell Identification (ECID) measurements of downlink signals received by the mobile device. Providing the assistance data may include sending a LPP Provide Assistance Data message to the mobile device. Providing the assistance data may include sending a NRPPa Assistance Information Control message to a serving base station of the mobile device.

An example method for determining a location of a mobile device according to the disclosure includes sending a request for downlink and uplink positioning reference signals to a network server, wherein the request includes downlink positioning reference signal configuration information and uplink positioning reference signal configuration information, receiving uplink configuration parameters based on the uplink positioning reference signal configuration information, transmitting one or more uplink positioning reference signals, receiving a first assistance data based on the downlink positioning reference signal configuration information, measuring one or more downlink positioning reference signals based at least in part on the downlink positioning reference signal configuration information, receiving a second assistance data based on the one or more uplink positioning reference signal measurements, and determining the location based at least on part on the measurements obtained from the one or more downlink positioning reference signals and the uplink positioning reference signal measurements.

Implementations of such a method may include one or more of the following features. The request for downlink and uplink positioning reference signals may be a Mobile-Originated Location Request (MO-LR). The request for downlink and uplink positioning reference signals may be a Radio Resource Control (RRC) Dedicated System Information Block (SIB) request. The downlink positioning reference signal configuration information or the uplink positioning reference signal configuration information may include at least one of a quality of service indicator, a time duration indicating how long the requested downlink and uplink positioning reference signals are required by the mobile device, and Reference Signal Received Power (RSRP) measurements of downlink signals received by the mobile device. A Mobile-Originated Location Request (MO-LR) response message indicating a time start and a duration for the one or more downlink positioning reference signals may be received. Receiving the uplink configuration parameters may include receiving a Radio Resource Control (RRC) message including the uplink configuration parameters. An uplink activation message may be received, such that transmitting the one or more uplink positioning reference signals is in response to receiving the uplink activation message. The uplink activation message may be a Medium Access Control Control Element (MAC-CE), or other information elements provided encapsulated or unencapsulated in Layer 1 (i.e., the physical layer) or Layer 2 (i.e., the MAC layer). The uplink positioning reference signal measurements may be gNB Rx-Tx Time Difference measurements. The first assistance data may be included in a Radio Resource Control (RRC) Reconfiguration message. Receiving the second assistance data may include receiving a LPP Provide Assistance Data message. The downlink positioning reference signal configuration information may be associated with one or more positioning reference signal resources in a positioning frequency layer.

An example method for providing location information to a mobile device according to the disclosure includes receiving a request for downlink and uplink positioning reference signals, wherein the request includes downlink positioning reference signal configuration information and uplink positioning reference signal configuration information, determining one or more base stations to provide downlink positioning reference signals based on the downlink positioning reference signal configuration information, requesting uplink positioning reference signal configuration information from at least one of the one or more base stations, providing the downlink positioning reference signal configuration information to the one or more base stations, receiving uplink positioning reference signal measurement information from the one or more base stations, and sending assistance data based on the downlink positioning reference signal configuration information and the uplink positioning reference signal measurement information.

Implementations of such a method may include one or more of the following features. The request for the downlink positioning reference signals may be based on a Mobile-Originated Location Request (MO-LR) received by a network server. The request for the downlink positioning reference signals may be based on a Radio Resource Control (RRC) Dedicated System Information Block (SIB) request received by a network base station. The downlink positioning reference signal configuration information or the uplink positioning reference signal configuration information may include at least one of a quality of service indicator, a time duration indicating how long the requested downlink and uplink positioning reference signals are required by the mobile device, and Reference Signal Received Power (RSRP) measurements of downlink signals received by the mobile device. A response message indicating a time start and a duration for the one or more downlink positioning reference signals may be provided. Determining one or more base stations to provide the downlink positioning reference signals may include selecting one or more positioning reference signal resources from a positioning frequency layer. Determining one or more base stations to provide the downlink positioning reference signals may include selecting one or more downlink positioning reference signal beams based on an approximate location of the mobile device. The approximate location of the mobile device may be based on at least one of a coverage area of a serving cell for the mobile device, Reference Signal Received Power (RSRP) measurements of downlink signals received by the mobile device, and Enhanced Cell Identification (ECID) measurements of downlink signals received by the mobile device. Providing the assistance data may include sending a LPP Provide Assistance Data message to the mobile device. Providing the assistance data may include sending a NRPPa Assistance Information Control message to a serving base station of the mobile device.

An example apparatus according to the disclosure includes a memory, at least one transceiver, at least one processor communicatively coupled to the memory and the at least one transceiver and configured to send a request for downlink positioning reference signals to a network server, wherein the request includes positioning reference signal configuration information, receive, via the at least one transceiver, assistance data based on the positioning reference signal configuration information, measure one or more downlink positioning reference signals based at least in part on the positioning reference signal configuration information, and determine a location based at least on part on the measurements obtained from the one or more downlink positioning reference signals and the assistance data.

Implementations of such an apparatus may include one or more of the following features. The request for the downlink positioning reference signals may be a Mobile-Originated Location Request (MO-LR). The request for the downlink positioning reference signals may be a Radio Resource Control (RRC) Dedicated System Information Block (SIB) request. The positioning reference signal configuration information may include at least one of a quality of service indicator, a time duration indicating how long the requested downlink positioning reference signals are required by a mobile device, and Reference Signal Received Power (RSRP) measurements of downlink signals received by the mobile device. The at least one processor may be further configured to receive a Mobile-Originated Location Request (MO-LR) response message indicating a time start and a duration for the one or more downlink positioning reference signals. The at least one processor may be configured to receive a Radio Resource Control (RRC) Reconfiguration message. The at least one processor may be configured to receive a LPP Provide Assistance Data message. The positioning reference signal configuration information may be associated with one or more positioning reference signal resources in a positioning frequency layer.

An example apparatus according to the disclosure includes a memory, at least one transceiver, at least one processor communicatively coupled to the memory and the at least one transceiver and configured to receive, via the at least one transceiver, a request for downlink positioning reference signals, wherein the request includes positioning reference signal configuration information, determine one or more base stations to provide the downlink positioning reference signals based on the positioning reference signal configuration information, provide the positioning reference signal configuration information to the one or more base stations, and provide assistance data based on the positioning reference signal configuration information.

Implementations of such an apparatus may include one or more of the following features. The request for the downlink positioning reference signals may be based on a Mobile-Originated Location Request (MO-LR) received by a network server. The request for the downlink positioning reference signals may be based on a Radio Resource Control (RRC) Dedicated System Information Block (SIB) request received by a network base station. The positioning reference signal configuration information may include at least one of a quality of service indicator, a time duration indicating how long the requested downlink positioning reference signals are required by a mobile device, and RSRP measurements of downlink signals received by the mobile device. The at least one processor may be further configured to provide a response message indicating a time start and a duration for the one or more downlink positioning reference signals. The at least one processor may be further configured to select one or more positioning reference signal resources from a positioning frequency layer. The at least one processor may be further configured to select one or more downlink positioning reference signal beams based on an approximate location of a mobile device. The approximate location of the mobile device may be based on at least one of a coverage area of a serving cell for the mobile device, Reference Signal Received Power (RSRP) measurements of downlink signals received by the mobile device, and Enhanced Cell Identification (ECID) measurements of downlink signals received by the mobile device. The at least one processor may be further configured to sending a LPP Provide Assistance Data message to a mobile device. The at least one processor may be further configured to send a NRPPa Assistance Information Control message to a serving base station of a mobile device.

An example apparatus according to the disclosure includes a memory, at least one transceiver, at least one processor communicatively coupled to the memory and the at least one transceiver and configured to transmit, via the at least one transceiver, a request for downlink and uplink positioning reference signals to a network server, wherein the request includes downlink positioning reference signal configuration information and uplink positioning reference signal configuration information, receive, via the at least one transceiver, uplink configuration parameters based on the uplink positioning reference signal configuration information, transmit one or more uplink positioning reference signals, receive, via the at least one transceiver, a first assistance data based on the downlink positioning reference signal configuration information, measure one or more downlink positioning reference signals based at least in part on the downlink positioning reference signal configuration information, receive, via the at least one transceiver, a second assistance data based on the one or more uplink positioning reference signal measurements, and determine a location based at least on part on the measurements obtained from the one or more downlink positioning reference signals and the uplink positioning reference signal measurements.

Implementations of such an apparatus may include on or more of the following features. The request for downlink and uplink positioning reference signals may be a Mobile-Originated Location Request (MO-LR). The request for downlink and uplink positioning reference signals may be a Radio Resource Control (RRC) Dedicated System Information Block (SIB) request. The downlink positioning reference signal configuration information or the uplink positioning reference signal configuration information may include at least one of a quality of service indicator, a time duration indicating how long the requested downlink and uplink positioning reference signals are required by a mobile device, and Reference Signal Received Power (RSRP) measurements of downlink signals received by the mobile device. The at least one processor may be further configured to receive a Mobile-Originated Location Request (MO-LR) response message indicating a time start and a duration for the one or more downlink positioning reference signals. The at least one processor may be further configured to receive a Radio Resource Control (RRC) message including the uplink configuration parameters. The at least one processor may be further configured to receive an uplink activation message and transmit the one or more uplink positioning reference signals in response to receiving the uplink activation message. The uplink activation message may be a Medium Access Control Control Element (MAC-CE), or other information elements provided encapsulated or unencapsulated in Layer 1 (i.e., the physical layer) or Layer 2 (i.e., the MAC layer). The uplink positioning reference signal measurements may be gNB Rx-Tx Time Difference measurements. The at least one processor may be further configured to receive a Radio Resource Control (RRC) Reconfiguration message. The at least one processor may be further configured to receive a LPP Provide Assistance Data message. The downlink positioning reference signal configuration information may be associated with one or more positioning reference signal resources in a positioning frequency layer.

An example apparatus according to the disclosure includes a memory, at least one transceiver, at least one processor communicatively coupled to the memory and the at least one transceiver and configured to receive, via the at least one transceiver, a request for downlink and uplink positioning reference signals, wherein the request includes downlink positioning reference signal configuration information and uplink positioning reference signal configuration information, determine one or more base stations to provide downlink positioning reference signals based on the downlink positioning reference signal configuration information, request uplink positioning reference signal configuration information from at least one of the one or more base stations, provide the downlink positioning reference signal configuration information to the one or more base stations, receive, via the at least one transceiver, uplink positioning reference signal measurement information from the one or more base stations, and transmit, via the at least one transceiver, assistance data based on the downlink positioning reference signal configuration information and the uplink positioning reference signal measurement information.

Implementations of such an apparatus may include one or more of the following features. The request for the downlink positioning reference signals may be based on a Mobile-Originated Location Request (MO-LR) received by a network server. The request for the downlink positioning reference signals may be based on a Radio Resource Control (RRC) Dedicated System Information Block (SIB) request received by a network base station. The downlink positioning reference signal configuration information or the uplink positioning reference signal configuration information may include at least one of a quality of service indicator, a time duration indicating how long the requested downlink and uplink positioning reference signals are required by a mobile device, and Reference Signal Received Power (RSRP) measurements of downlink signals received by the mobile device. The at least one processor may be further configured to provide a response message indicating a time start and a duration for the one or more downlink positioning reference signals. The at least one processor may be further configured to select one or more positioning reference signal resources from a positioning frequency layer. The at least one processor may be further configured to select one or more downlink positioning reference signal beams based on an approximate location of a mobile device. The approximate location of the mobile device may be based on at least one of a coverage area of a serving cell for the mobile device, Reference Signal Received Power (RSRP) measurements of downlink signals received by the mobile device, and Enhanced Cell Identification (ECID) measurements of downlink signals received by the mobile device. The at least one processor may be further configured send a LPP Provide Assistance Data message to a mobile device. The at least one processor may be further configured to send a NRPPa Assistance Information Control message to a serving base station of a mobile device.

An example apparatus for determining a location of a mobile device according to the disclosure includes means for sending a request for downlink positioning reference signals to a network server, wherein the request includes positioning reference signal configuration information, means for receiving assistance data based on the positioning reference signal configuration information, means for measuring one or more downlink positioning reference signals based at least in part on the positioning reference signal configuration information, and means for determining the location based at least on part on the measurements obtained from the one or more downlink positioning reference signals and the assistance data.

An example apparatus for providing location information to a mobile device according to the disclosure includes means for receiving a request for downlink positioning reference signals, wherein the request includes positioning reference signal configuration information, means for determining one or more base stations to provide the downlink positioning reference signals based on the positioning reference signal configuration information, means for providing the positioning reference signal configuration information to the one or more base stations, and means for providing assistance data based on the positioning reference signal configuration information.

An example apparatus for determining a location of a mobile device according to the disclosure includes means for sending a request for downlink and uplink positioning reference signals to a network server, wherein the request includes downlink positioning reference signal configuration information and uplink positioning reference signal configuration information, means for receiving uplink configuration parameters based on the uplink positioning reference signal configuration information, means for transmitting one or more uplink positioning reference signals, means for receiving a first assistance data based on the downlink positioning reference signal configuration information, means for measuring one or more downlink positioning reference signals based at least in part on the downlink positioning reference signal configuration information, means for receiving a second assistance data based on the one or more uplink positioning reference signal measurements, and means for determining the location based at least on part on the measurements obtained from the one or more downlink positioning reference signals and the uplink positioning reference signal measurements.

An example apparatus for providing location information to a mobile device according to the disclosure includes means for receiving a request for downlink and uplink positioning reference signals, wherein the request includes downlink positioning reference signal configuration information and uplink positioning reference signal configuration information, means for determining one or more base stations to provide downlink positioning reference signals based on the downlink positioning reference signal configuration information, means for requesting uplink positioning reference signal configuration information from at least one of the one or more base stations, means for providing the downlink positioning reference signal configuration information to the one or more base stations, means for receiving uplink positioning reference signal measurement information from the one or more base stations, and means for sending assistance data based on the downlink positioning reference signal configuration information and the uplink positioning reference signal measurement information.

An example non-transitory processor-readable storage medium comprising processor-readable instructions configured to cause one or more processors to determine a location of a mobile device according to the disclosure includes code for sending a request for downlink positioning reference signals to a network server, wherein the request includes positioning reference signal configuration information, code for receiving assistance data based on the positioning reference signal configuration information, code for measuring one or more downlink positioning reference signals based at least in part on the positioning reference signal configuration information, and code for determining the location based at least on part on the measurements obtained from the one or more downlink positioning reference signals and the assistance data.

An example non-transitory processor-readable storage medium comprising processor-readable instructions configured to cause one or more processors to provide location information to a mobile device according to the disclosure includes code for receiving a request for downlink positioning reference signals, wherein the request includes positioning reference signal configuration information, code for determining one or more base stations to provide the downlink positioning reference signals based on the positioning reference signal configuration information, code for providing the positioning reference signal configuration information to the one or more base stations, and code for providing assistance data based on the positioning reference signal configuration information.

An example non-transitory processor-readable storage medium comprising processor-readable instructions configured to cause one or more processors to determine a location of a mobile device according to the disclosure includes code for sending a request for downlink and uplink positioning reference signals to a network server, wherein the request includes downlink positioning reference signal configuration information and uplink positioning reference signal configuration information, code for receiving uplink configuration parameters based on the uplink positioning reference signal configuration information, code for transmitting one or more uplink positioning reference signals, code for receiving a first assistance data based on the downlink positioning reference signal configuration information, code for measuring one or more downlink positioning reference signals based at least in part on the downlink positioning reference signal configuration information, code for receiving a second assistance data based on the one or more uplink positioning reference signal measurements, and code for determining the location based at least on part on the measurements obtained from the one or more downlink positioning reference signals and the uplink positioning reference signal measurements.

An example non-transitory processor-readable storage medium comprising processor-readable instructions configured to cause one or more processors to provide location information to a mobile device according to the disclosure includes code for receiving a request for downlink and uplink positioning reference signals, wherein the request includes downlink positioning reference signal configuration information and uplink positioning reference signal configuration information, code for determining one or more base stations to provide downlink positioning reference signals based on the downlink positioning reference signal configuration information, code for requesting uplink positioning reference signal configuration information from at least one of the one or more base stations, code for providing the downlink positioning reference signal configuration information to the one or more base stations, code for receiving uplink positioning reference signal measurement information from the one or more base stations, and code for sending assistance data based on the downlink positioning reference signal configuration information and the uplink positioning reference signal measurement information.

Items and/or techniques described herein may provide one or more of the following capabilities, as well as other capabilities not mentioned. A mobile device may be configured to request downlink positioning reference signals or provide uplink positioning reference signals on-demand. The on-demand request may enable a communication network to change positioning reference signal resource allocation dynamically. A Mobile-Originated Location Request (MO-LR) procedure or an on-demand System Information (SI) request procedure may be used by the mobile device to request a DL-PRS transmission from the network on-demand or request UL-PRS configuration on-demand. The on-demand positioning reference signal procedures may be implemented by extending existing MO-LR and/or SI request procedures and thus may reduce the need to create new procedures. Other capabilities may be provided and not every implementation according to the disclosure must provide any, let alone all, of the capabilities discussed.

Figure 1:
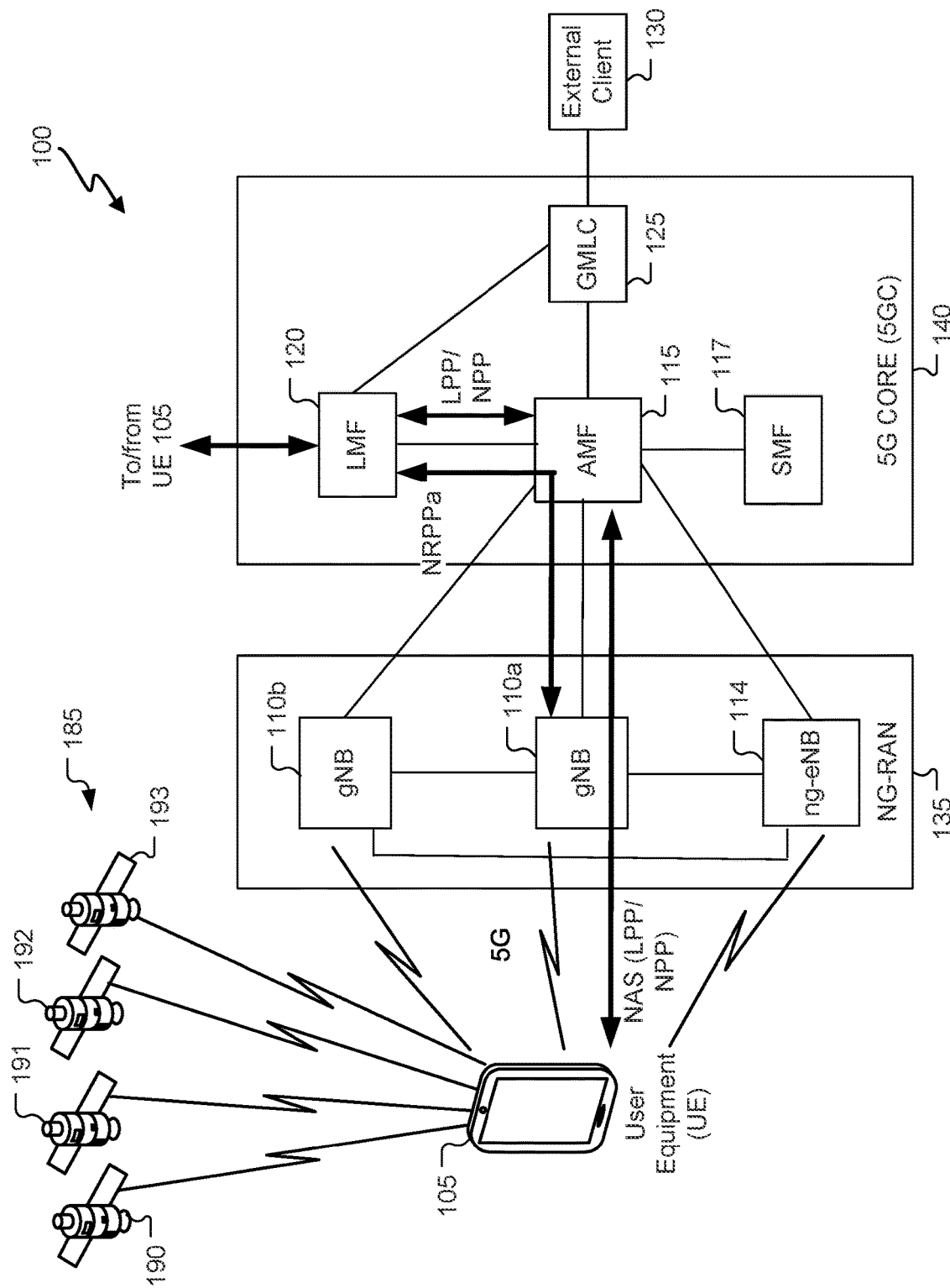
FIG. 1 is a simplified diagram of an example wireless communications system.

Elements, stages, steps, and/or actions with the same reference label in different drawings may correspond to one another (e.g., may be similar or identical to one another). In addition, multiple instances of an element may be indicated by following a first number for the element with a letter. For example, multiple instances of an element 110 may be indicated as 110*a*, 110*b*, 110*c* etc. When referring to such an element using only the first number, any instance of the element is to be understood (e.g. element 110 in the previous example would refer to elements 110*a*, 110*b*, 110*c*).

DETAILED DESCRIPTION

Techniques are discussed herein for providing on-demand positioning reference signals (PRS) to user equipment (UE). Prior implementations of downlink (DL) PRS transmissions are typically in an "always-on" configuration such that a base station will transmit PRS regardless of the requirements of the UEs in the network. Such an "always-on" configuration may utilize scarce resources such as bandwidth, energy, as well as require unnecessary overhead when UE positioning is not required during a particular time or in a particular area of a network. In networks which utilize beamformed DL-PRS transmissions (e.g., 5G NR), the DL-PRS transmissions in all beam sweeping directions may result in unnecessary transmissions of DL-PRSs. The "always-on" configuration may also utilize static allocation of DL-PRS resources. In general, a static DL-PRS resource allocation does not allow for temporary increases of the DL-PRS resources to realize higher positioning accuracy and/or lower latency positioning requirements in certain areas or at certain times. Similarly, the static allocation of DL-PRS resources does not allow for a decrease of DL-PRS resources in case positioning requirements can be met with fewer DL-PRS resources or in case no UEs need to be positioned for a period of time.

The on-demand DL-PRS techniques described herein enable a network to change the DL-PRS resource allocation dynamically as required (e.g., based on the requirements for a particular use case or application). In an example, the on-demand DL-PRS techniques may enable the network to dynamically vary configuration parameters such as a DL-PRS occasion periodicity, a duration of the DL-PRS occasions, a DL-PRS bandwidth, and a DL-PRS spatial direction.

A DL PRS configuration may define transmission of DL-PRS (e.g. within one or more cells and/or by one or more base stations) according to a particular set of DL-PRS configuration parameter values. For example, the DL-PRS transmission may use particular values for such parameters as DL-PRS bandwidth, DL-PRS frequency (or frequencies), duration of DL-PRS positioning occasions, spatial direction(s) of DL-PRS positioning occasions, periodicity of DL-PRS positioning occasions, DL-PRS encoding, DL-PRS muting pattern. A DL PRS configuration can be static and may correspond to "always on" DL-PRS transmission if the particular values for the parameters of the DL-PRS transmission are not changed or may, as described herein, be capable of being changed (e.g. replaced with a different DL PRS Configuration).

In an embodiment, on-demand DL-PRS may be realized in a network by defining a set of different DL-PRS configurations whose parameter values may be configured in the network using operation and maintenance (O&M) procedures. For example, one set of DL-PRS configuration parameter values (also referred to herein as just "parameters") may be configured to correspond to "normal" DL-PRS transmissions, and in some networks the "normal" DL-PRS transmissions may equate to no DL-PRS transmissions at all (e.g., to minimize resource usage). In other examples, one or more levels of increased DL-PRS transmissions may each be associated with different sets of DL-PRS configuration parameter values, e.g. such as parameter values defining DL-PRS bandwidth, DL-PRS frequencies, duration of DL-PRS positioning occasions, spatial directions of DL-PRS positioning occasions, and periodicity of DL-PRS positioning occasions. Transmission of DL-PRS can then be changed (e.g. increased or reduced) by changing a DL-PRS configuration that is used to transmit DL-PRS. The change can be "on-demand" in the sense that an entity such as a UE or a location services (LCS) Client can be allowed to indicate parameter values or characteristics (e.g. "high QoS", "low QoS") for a new DL PRS Configuration or set of new DL PRS Configurations to be used to transmit DL PRS in a particular cell or cells and/or by a particular base station or base stations.

On-demand DL-PRS may have implications for UE-based positioning based on requests from internal UE clients. For example, when an application residing in the UE requires a location, there may be no (or not sufficient) DL-PRS resources available (e.g., all gNBs located around the UE location may have the DL-PRS "turned-off"). Further, for certain positioning measurements (e.g., UE Rx-Tx Time Difference measurement), a UE may require both, DL-PRS and uplink PRS (UL-PRS, also referred to as a Sounding Reference Signal (SRS) for positioning) in order to perform the positioning measurements. When an internal UE client requests a location, the UE may not have been configured with a desired UL-PRS (e.g., with desired periodicity, bandwidth, duration, etc.). The on-demand PRS techniques described herein may enable a UE to request DL-PRS transmissions from a network and/or provide an UL-PRS configuration on-demand.

In an embodiment, a Mobile-Originated Location Request (MO-LR) procedure or an on-demand System Information (SI) request procedure may be used by a target UE to request on-demand one or more DL-PRS transmissions from a network and/or request UL-PRS configuration information. The techniques provided herein reduce the impact to the UE and network because they extend existing procedures rather than creating new procedures. In an example, the procedures for determining and configuring the new PRS may be the same and independent of whether the demand for PRS is triggered by the network or by a UE. These techniques and configurations are examples, and other techniques and configurations may be used.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). The NG-RAN 135 may be another type of RAN, e.g., a 3G RAN, a 4G Long Term Evolution (LTE) RAN, etc. The communication system 100 may utilize information from a constellation 185 of space vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR NodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as WiFi®), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as gNodeBs (gNBs) 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs, such as the gNB 110*a*, the gNB 110*b*, and the ng-eNB 114, may each comprise one or more TRPs. For example, each sector within a cell of a BS may comprise a TRP, although multiple TRPs may share one or more components (e.g., share a processor but have separate antennas). The system 100 may include macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 37.355. Here, LPP messages may be transferred between the UE 105 and the LMF 120 via the AMF 115 and the serving gNB 110*a*, 110*b* or the serving ng-eNB 114 for the UE 105. For example, LPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), UE Receive-minus-Transmit Time Difference (Rx-Tx Time Difference), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, Rx-Tx Time Difference, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP message via the NG-RAN 135 and the 5GC 140.

An LPP message sent from the LMF 120 to the UE 105 may instruct the UE 105 to do any of a variety of things depending on desired functionality. For example, the LPP message could contain an instruction for the UE 105 to obtain measurements for GNSS (or A-GNSS), WLAN, E-CID, and/or OTDOA (or some other position method). In the case of E-CID, the LPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the UE's position.

Figure 2:
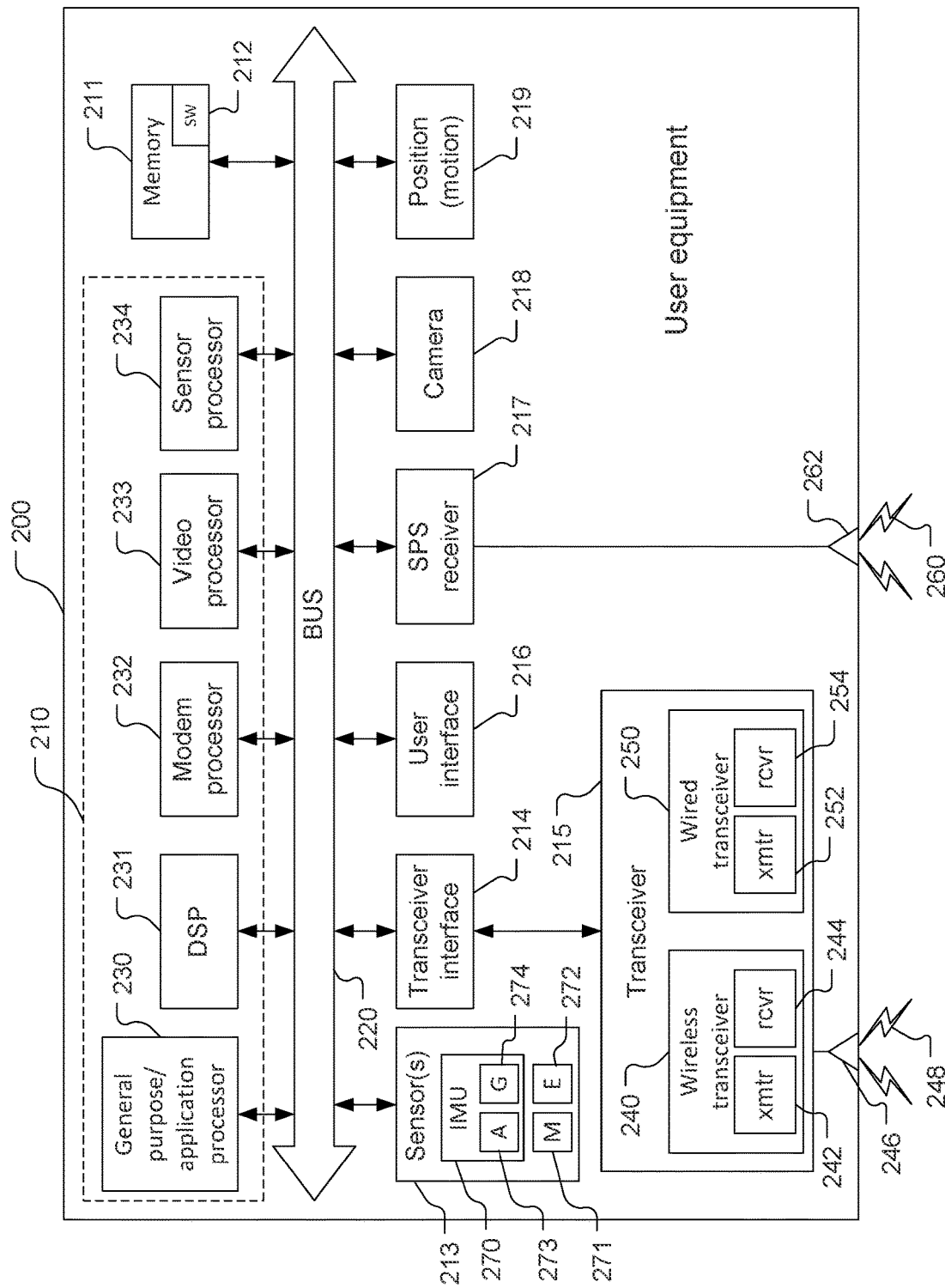
FIG. 2 is a block diagram of components of an example user equipment.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sensing (with one or more wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), V2C (Uu), IEEE 802.11 (including IEEE 802.11p), WiFi®, WiFi Direct® (WiFi-D), Bluetooth®, Zigbee® etc. NR systems may be configured to operate on different frequency layers such as FR1 (e.g., 410-7125 MHz) and FR2 (e.g., 24.25-52.6 GHz), and may extend into new bands such as sub-6 GHZ and/or 100 GHz and higher (e.g., FR2x, FR3, FR4). The wired transceiver 250 may include a transmitter 252 and a receiver 254 configured for wired communication, e.g., with the NG-RAN 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion. In an example the PMD 219 may be referred to as a Positioning Engine (PE), and may be performed by the general-purpose processor 230. For example, the PMD 219 may be a logical entity and may be integrated with the general-processor 230 and the memory 211.

Figure 3:
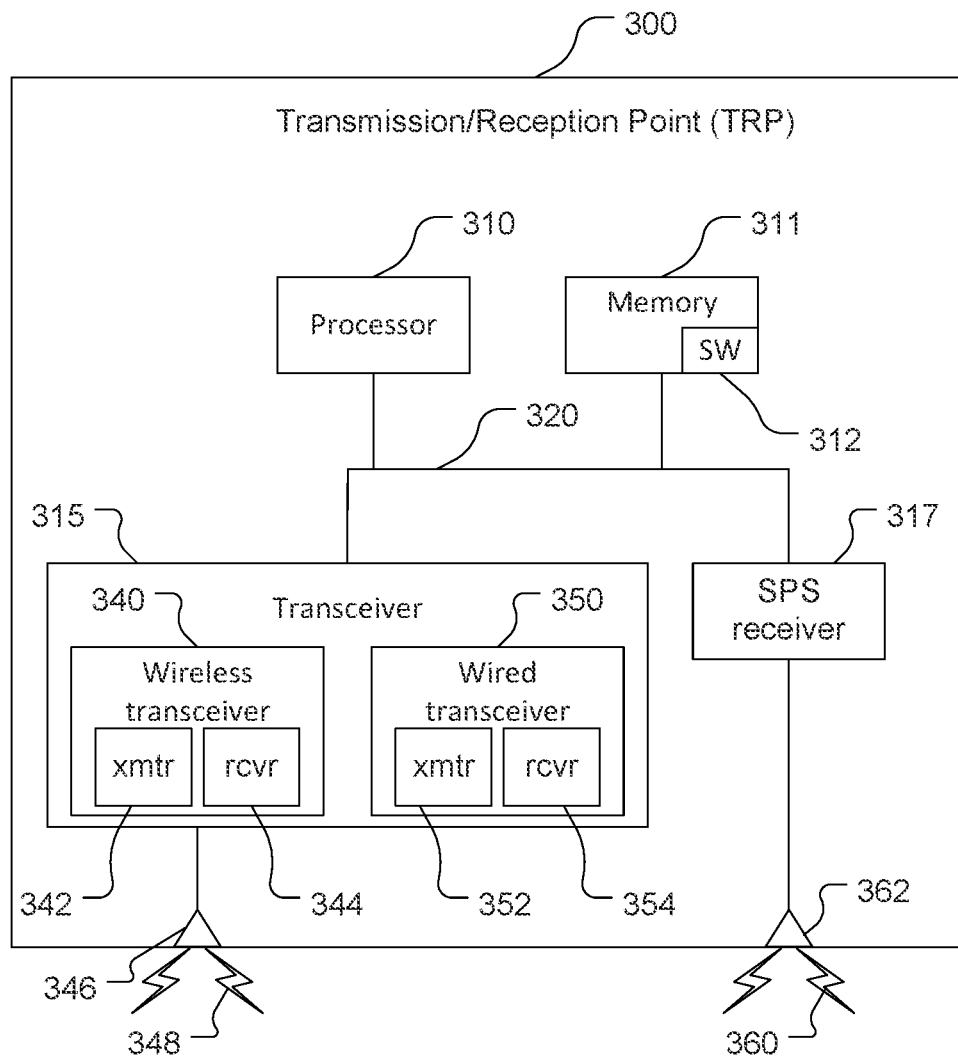
FIG. 3 is a block diagram of components of an example transmission/reception point.
Figure 4:
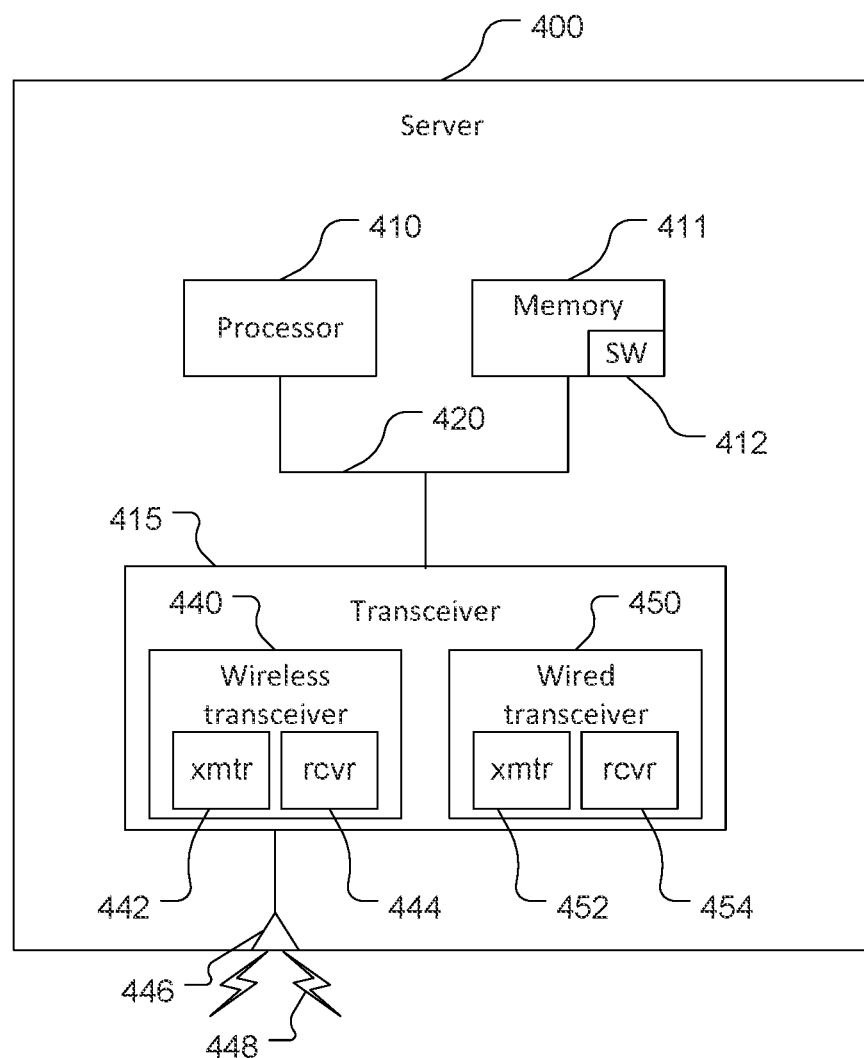
FIG. 4 is a block diagram of components of an example server.

Referring also to FIG. 3, an example of a TRP 300 of the gNB 110a, gNB 110b, ng-eNB 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 4). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the gNB 110a, gNB 110b, ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi®, WiFi Direct® (WiFi-D), Bluetooth®, Zigbee® etc. The wired transceiver 350 may include a transmitter 352 and a receiver 354 configured for wired communication, e.g., with the core network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 4). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi®, WiFi Direct® (WiFi-D), Bluetooth®, Zigbee® etc. The wired transceiver 450 may include a transmitter 452 and a receiver 454 configured for wired communication, e.g., with the NG-RAN 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figures 5A, 5B:
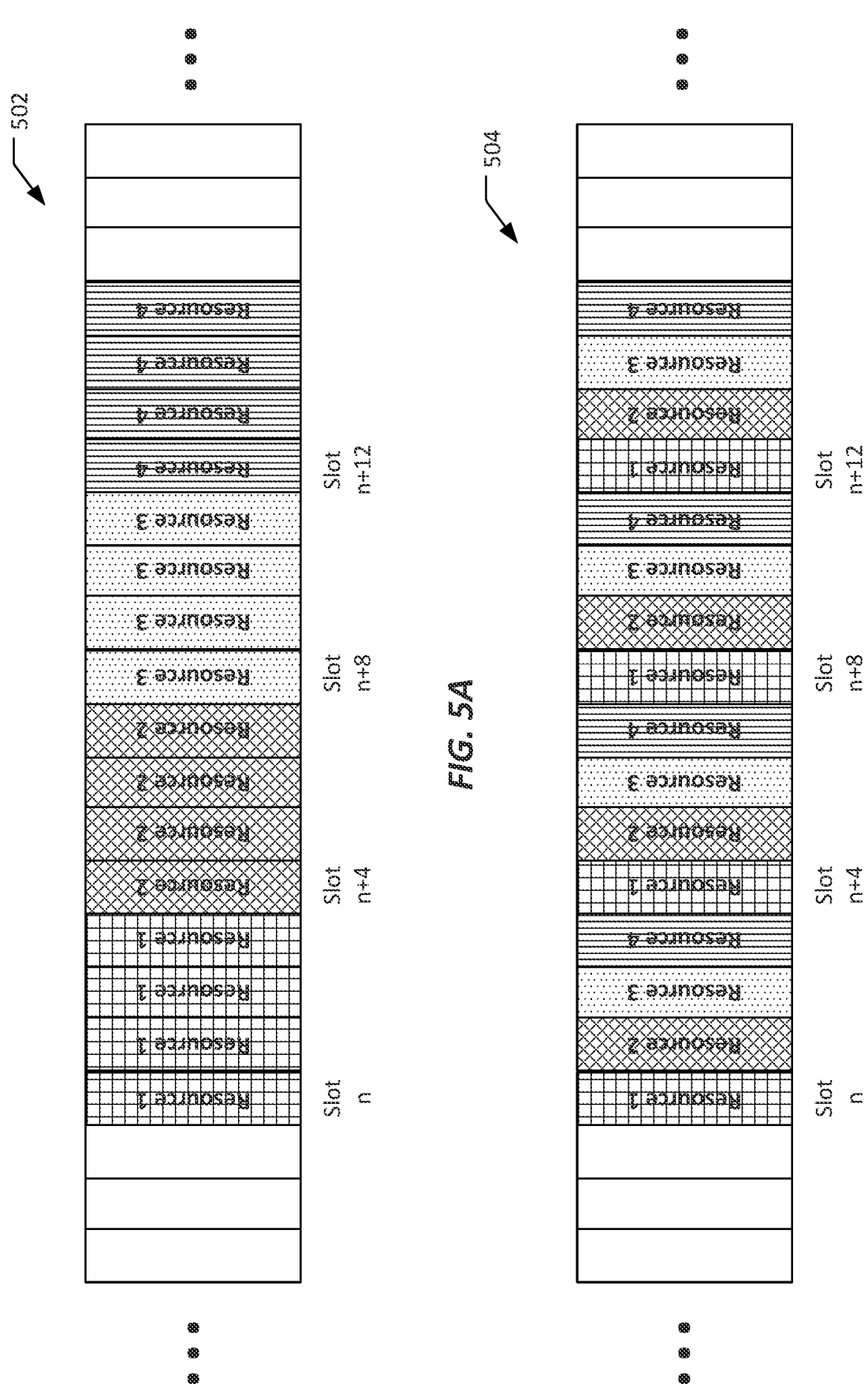
FIGS. 5A and 5B illustrate example downlink positioning reference signal resource sets.

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting. A single instance of a PRS Resource Set as shown in FIG. 5A and FIG. 5B may also be referred to as a "PRS occasion".

Figure 6:
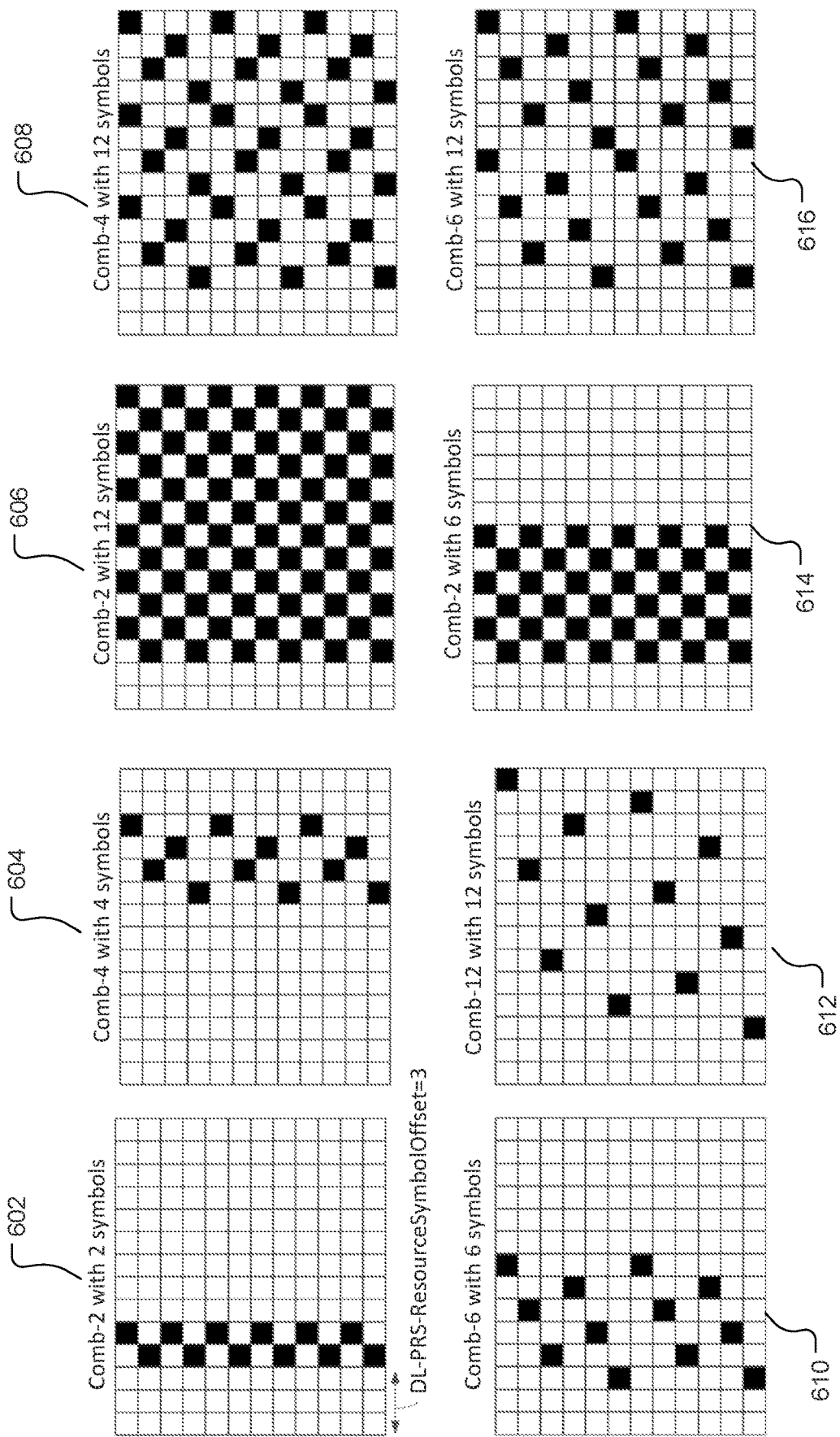
FIG. 6 is an illustration of example subframe formats for positioning reference signal transmission.

Referring to FIG. 6, example subframe and slot formats for positioning reference signal transmissions are shown. The example subframe and slot formats are included in the PRS resource sets depicted in FIGS. 5A and 5B. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. Typically, a base station may transmit the PRS from antenna port 5000 on one or more slots in each subframe configured for PRS transmission.

A base station may transmit the PRS over a particular PRS bandwidth, which may be configured by higher layers. A PRS Resource may be located anywhere in the frequency grid. A common reference point for the PRS may be defined as "PRS Point A". The "PRS Point A" may serve as a common reference point for the PRS resource block grid and may be represented by an Absolute Radio Frequency Channel Number (ARFCN). The PRS Start Physical Resource Block (PRB) may then be defined as a frequency offset between PRS Point A and the lowest subcarrier of the lowest PRS resource block expressed in units of resource blocks. The base station may transmit the PRS on subcarriers spaced apart across the PRS bandwidth.

The base station may also transmit the PRS based on the parameters such as PRS periodicity, PRS Resource Set Slot Offset, PRS Resource Slot Offset, PRS Resource Repetition Factor and PRS Resource Time Gap. PRS periodicity is the periodicity at which the PRS Resource is transmitted in number of slots. The PRS periodicity may depend on the subcarrier spacing (SCS) and may be, for example, $2^\mu\{4, 5, 8, 10, 16, 20, 32, 40, 64, 80, 160, 320, 640, 1280, 2560, 5120, 10240\}$ slots, with $\mu=0, 1, 2, 3$ for SCS 15, 30, 60, and 120 kHz, respectively. PRS Resource Set Slot Offset defines the slot offset with respect to System Frame Number (SFN)/Slot Number zero of the TRP (i.e., defines the slot where the first PRS Resource of the PRS Resource Set occurs). PRS Resource Slot Offset defines the starting slot of the PRS Resource with respect to the corresponding PRS Resource Set Slot Offset. PRS Resource Repetition Factor defines how many times each PRS Resource is repeated for a single instance of the PRS Resource Set, and PRS Resource Time Gap defines the offset in number of slots between two repeated instances of a PRS Resource within a single instance of the PRS Resource Set, as described above.

A PRS Resource may be muted. Muting may be signaled using a bit-map to indicate which configured PRS Resources are transmitted with zero-power (i.e., muted). In one option, the muting bit map may have a length of $\{2, 4, 6, 8, 16, 32\}$ bits and muting is applied on each transmission instance of a PRS Resource Set. Each bit in the bit map may correspond to a configurable number of consecutive instances of a PRS Resource Set. All PRS Resources within a PRS Resource Set instance may be muted (transmitted with zero power) if the corresponding bit in the bit map indicates a '0'. The number of consecutive instances may be controlled by the parameter PRS Muting-Bit Repetition Factor, which may have the values $\{1, 2, 4, 8\}$. In another option, muting may be applied on each repetition of each of the PRS Resources. Each bit in the bit map may correspond to a single repetition of the PRS Resource within an instance of a PRS Resource Set. The length of the bit map may then be equal to the PRS Resource Repetition Factor.

In general, the PRS resources depicted in FIGS. 5A and 5B may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). Each of the PRS resources in the PRS resource set may have the same periodicity, a common muting pattern, and the same repetition factor across slots. A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

Figure 7:
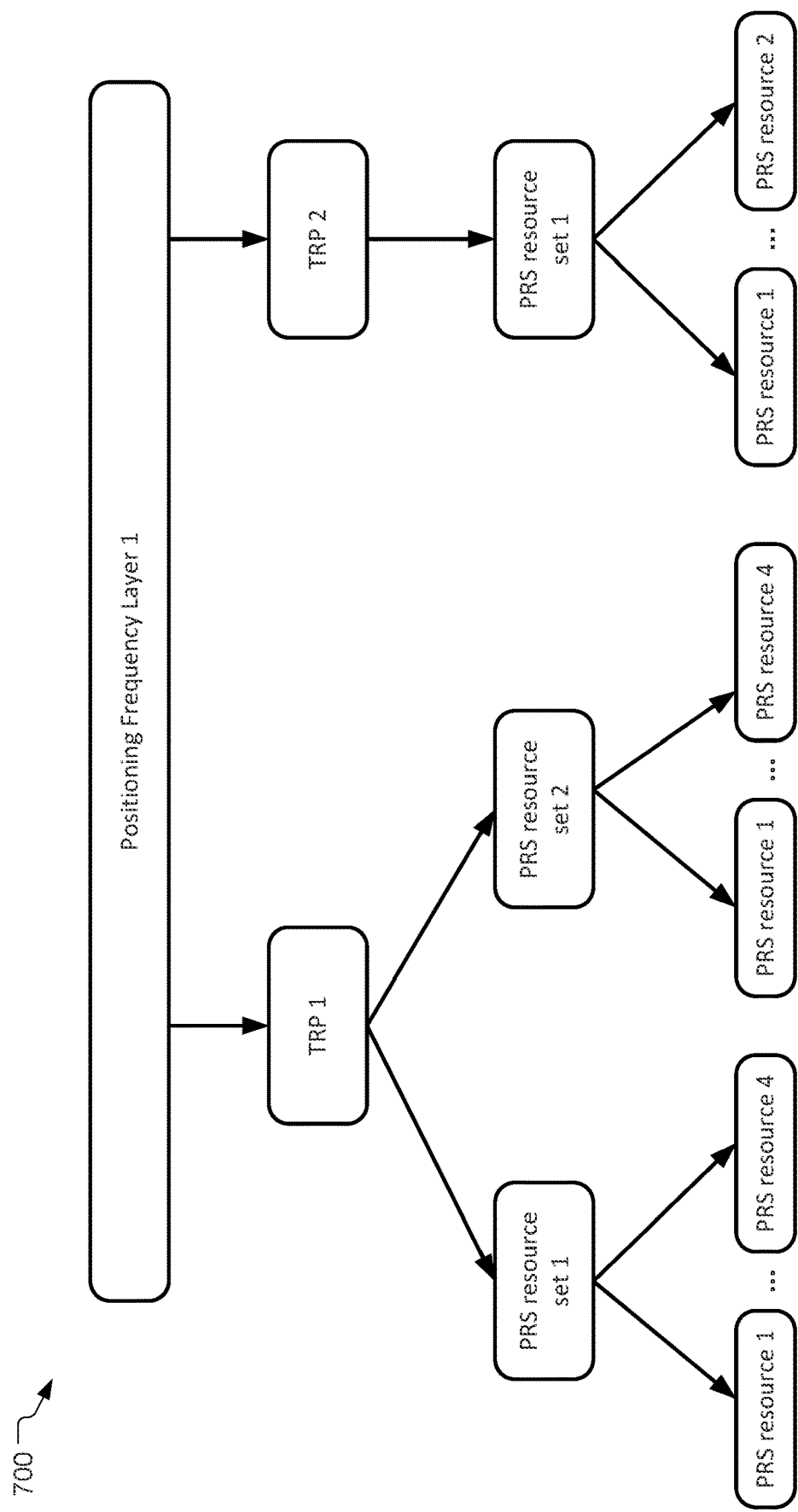
FIG. 7 is a conceptual diagram of an example positioning frequency layer.

Referring to FIG. 7, a conceptual diagram of an example positioning frequency layer 700 is shown. In an example, the positioning frequency layer 700 may be a collection of PRS resource sets across one or more TRPs. The positioning frequency layer may have the same subcarrier spacing (SCS) and cyclic prefix (CP) type, the same PRS Point-A, the same value of PRS Bandwidth, the same start PRB, and the same value of comb-size. The numerologies supported for PDSCH may be supported for PRS. Each of the PRS resource sets in the positioning frequency layer 700 is a collection of PRS resources across one TRP which have the same periodicity, a common muting pattern configuration, and the same repetition factor across slots.

Note that the terms positioning reference signal and PRS are reference signals that can be used for positioning, such as but not limited to, PRS signals, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

If the PRS is transmitted by a TRP, the PRS may be referred to as DL-PRS; if the PRS is transmitted by a UE, the PRS may be referred to as UL-PRS. The UL-PRS may be based on SRS with enhancements for positioning purposes. The UL-PRS may also be referred to as "SRS for positioning". In some respects, the UL-PRS can be seen as the uplink equivalence to the DL-PRS.

The ability of a UE to process PRS signals may vary based on the capabilities of the UE. In general, however, industry standards may be developed to establish a common PRS capability for UEs in a network. For example, an industry standard may require that a duration of DL PRS symbol in units of milliseconds (ms) a UE can process every T ms assuming a maximum DL PRS bandwidth in MHz, which is supported and reported by UE. As examples, and not limitations, the maximum DL PRS bandwidth for the FR1 bands may be 5, 10, 20, 40, 50, 80, 100 MHz, and for the FR2 bands may be 50, 100, 200, 400 MHz. The standards may also indicate a DL PRS buffering capability as a Type 1 (i.e., sub-slot/symbol level buffering), or a Type 2 (i.e., slot level buffering). The common UE capabilities may indicate a duration of DL PRS symbols N in units of ms a UE can process every T ms assuming maximum DL PRS bandwidth in MHz, which is supported and reported by a UE. Example T values may include 8, 16, 20, 30, 40, 80, 160, 320, 640, 1280 ms, and example N values may include 0.125, 0.25, 0.5, 1, 2, 4, 6, 8, 12, 16, 20, 25, 30, 32, 35, 40, 45, 50 ms. A UE may be configured to report a combination of (N, T) values per band, where N is a duration of DL PRS symbols in ms processed every T ms for a given maximum bandwidth (B) in MHz supported by a UE. In general, a UE may not be expected to support a DL PRS bandwidth that exceeds the reported DL PRS bandwidth value. The UE DL PRS processing capability may be defined for a single positioning frequency layer 700. The UE DL PRS processing capability may be agnostic to DL PRS comb factor configurations such as depicted in FIG. 6. The UE processing capability may indicate a maximum number of DL PRS resources that a UE can process in a slot under it. For example, the maximum number for FR1 bands may be 1, 2, 4, 6, 8, 12, 16, 24, 32, 48, 64 for each SCS: 15 kHz, 30 kHz, 60 kHz, and the maximum number for the FR2 bands may be 1, 2, 4, 6, 8, 12, 16, 24, 32, 48, 64 for each SCS: 15 kHz, 30 kHz, 60 kHz, 120 kHz.

Figure 8:
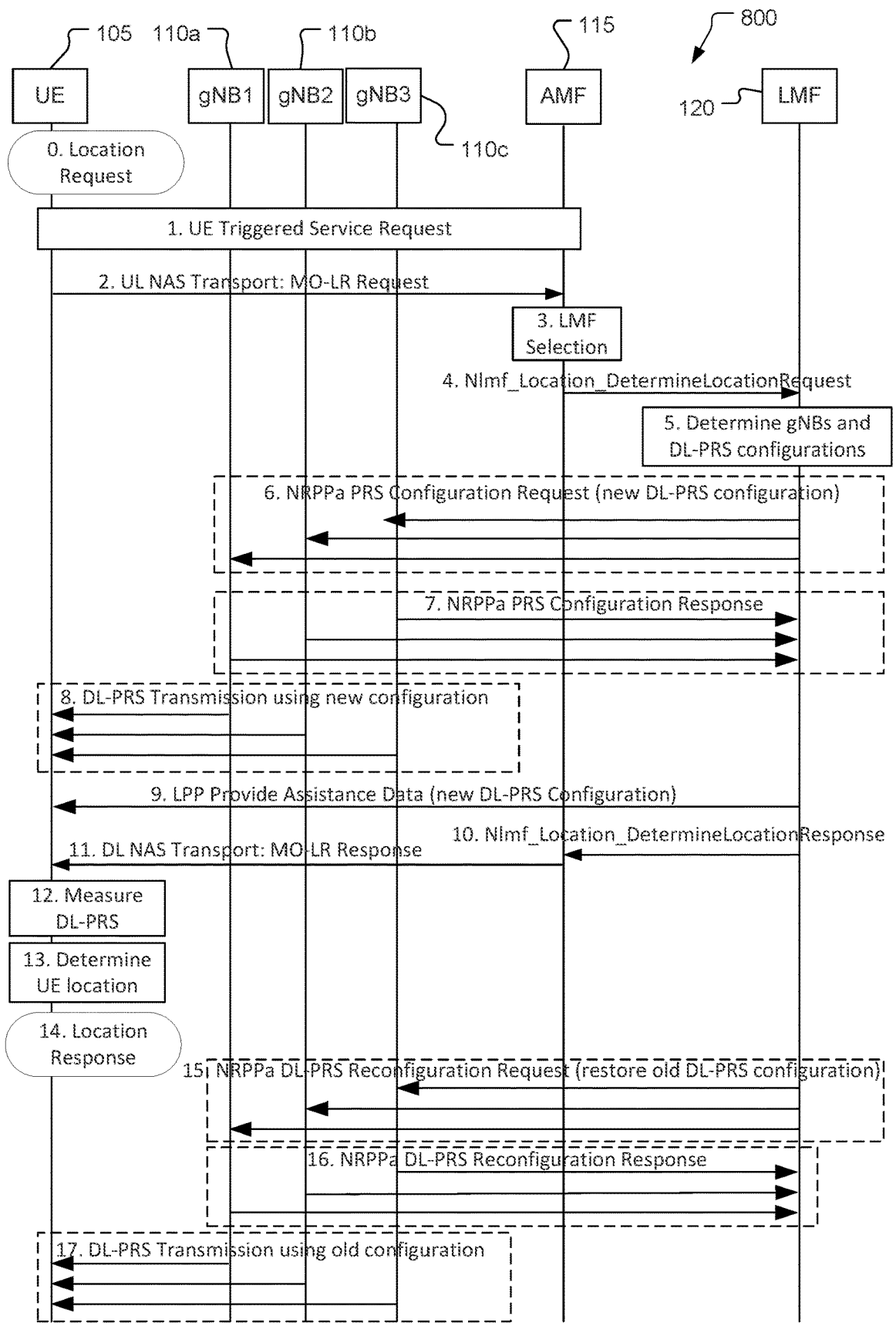
FIG. 8 is an example message flow diagram for extending mobile-originated location request procedures for enabling on-demand DL-PRS.

Referring to FIG. 8, an example message flow 800 for extending mobile-originated location request (MO-LR) procedures for enabling on-demand DL-PRS is shown. The example message flow 800 includes the UE 105 and three example TRPs 300 such as the first gNB1 110*a*, gNB2 110*b*, and the third gNB3 110*c*, and elements of the core network 140 such as the AMF 115 and the LMF 120. The message flow 800 may be used to extend existing MO-LR procedures for requesting assistance data (e.g., for DL-TDOA, DL-AoD or multi-RTT). For example, the UE 105 may be configured to request assistance data from the LMF 120 for UE assisted or UE based positioning using one or more of the positioning methods and may include additional parameters for indicating preferences for DL-PRS. The additional parameters may describe, for example, a desired PRS configuration and may include one or more of a preferred time or time period for the PRS configuration (e.g. current time, start time plus stop time), a preferred PRS resource bandwidth, a preferred duration of PRS positioning occasions, a preferred periodicity of the PRS positioning occasions, a preferred carrier frequency or frequency layer for the PRS resources, a preferred number and locations of gNBs/TRPs for which the PRS configuration around the UE location is requested, where the location of the gNBs/TRPs may be specified using a PCI or CGI, or as a specific location or a geographical region which may be expressed in absolute global coordinates or using a zone-identifier (e.g., similar to zone-ID used in NR Rel-16 Sidelink), or using coordinates relative to a known reference location (such as the location of a specific cell, such as the serving cell, provided to the UE in the assistance data), a preferred PRS beam direction or directions for individual gNBs, RSRP or RSRQ measurements performed by the UE on available DL signals (e.g., measurements for Radio Resource Management (RRM)), a Quality of Service (QoS) parameter describing the target location accuracy and latency (e.g., desired accuracy and response time for any location estimate based on PRS measurements (e.g., as requested by an UE internal client (e.g., an App))), and the PRS capabilities of the UE (e.g. as defined for LPP). Other parameters may also be used based on the configurations and capabilities of the respective gNBs and UEs.

In an example, these additional parameters may be provided explicitly, e.g., indicating a desired PRS Resource Bandwidth in certain units (e.g., PRBs, Hz, etc.), or indicating a duration in number of OFDM symbols, or slots, etc. In an example, the additional parameters may be combined into a qualitative descriptor such as "high accuracy PRS", "medium accuracy PRS" and "low accuracy PRS" and/or "low latency PRS", "medium latency PRS" and "high latency PRS", where each qualitative descriptor may have an associated quantitative definition. The LMF 120 may be configured to determine appropriate explicit parameters for the PRS configuration using some preconfigured mapping table/function (e.g., via O&M).

Referring to the message flow 800, at stage 0, the UE 105 may receive a location request from an internal client (e.g. an App). The UE 105 may determine that a change in DL-PRS transmission is needed (e.g. increased DL-PRS bandwidth, increased duration of positioning occasions (e.g., increased PRS Resource Repetition Factor), DL-PRS transmission from more nearby gNBs, etc.) to meet the QoS requirement from the application. At stage 1., if the UE 105 is in an CM-IDLE state, the UE 105 may be configured to instigate a UE triggered Service Request as defined in clause 4.2.3.2 of 3GPP TS 23.502 in order to establish a signaling connection with the AMF. During this stage, AMF 115 may announce to the UE 105 its ability to support MO-LR for on-demand DL-PRS requests; for example, in a 5GS network feature support information element defined in 3GPP TS 24.501. At stage 2., the UE 105 is configured to send an MO-LR Request message included in an UL NAS TRANSPORT message to the serving AMF 115 including a request for a change in DL-PRS transmission. The request may include the DL-PRS capabilities of the UE 105 (e.g. in an embedded LPP Provide Capabilities message) and parameters for preferred DL-PRS configurations (which may include a preferred DL-PRS bandwidth, a preferred duration of DL-PRS positioning occasions, preferred DL-PRS beam directions for certain gNBs if known by the UE and a preferred number of nearby gNBs to which this applies). The requested DL-PRS configuration parameter(s) may be provided in a LPP Request Assistance Data message included in the MO-LR Request. In an example, the request for a change (e.g., increase) in DL-PRS transmission may also include a Quality of Service (QoS) indicator, such as required accuracy of the location estimate and/or a response time indicating when the internal client requires the location estimate. The MO-LR Request message may also include a time duration for how long the requested DL-PRS configuration is required at the UE (e.g., number of seconds or minutes for which the DL-PRS configuration is required). The MO-LR Request may also include (e.g. in an embedded LPP Provide Location Information message) RSRP measurements (e.g., per beam) of DL signals received by the UE (e.g., an E-CID Location Measurement Report) to assist an LMF 120 in determining nearby gNBs and/or beam directions for DL-PRS.

At stage 3., the AMF 115 selects the LMF 120 (e.g. as described in 3GPP TS 23.273, section 5.1.), and at stage 4. the AMF 115 invokes the Nlmf_Location_DetermineLocation service operation towards the LMF 120. The service operation may indicate one or more of: (i) a request for assistance data; (ii) a request for on demand DL-PRS; (iii) an MO-LR request. The service operation may also include the MO-LR Request received at stage 2, any LPP messages received at stage 2 that were included in the MO-LR Request at stage 2, and/or a list of assistance data types for which UE 105 has a subscription.

At stage 5., the LMF 120 may first verify that the UE 105 has a subscription to request new DL-PRS configurations based on the list of assistance data types for which UE 105 has a subscription that were received at stage 4. Based on the request in stage 4, the LMF 120 may then be configured to determine, at stage 5, a new DL-PRS configuration (or configurations) for nearby gNBs (e.g. based on a preferred number of gNBs indicated at stage 2). The determination at stage 5 may also be based on DL-PRS requests received from other UEs as in stage 2 and/or on location procedures for other UEs which occur at about the same time. The new DL-PRS configuration for each gNB 110*a-c* may use changed (e.g., increased) DL-PRS bandwidth, a changed (e.g., longer) duration of DL-PRS positioning occasions, DL-PRS transmission on new frequencies, and/or a higher frequency of DL-PRS positioning occasions. In an example, the new DL-PRS configuration may be selected from a set of one or more preconfigured sets of DL-PRS configuration parameters, such as the PRS resources in the positioning frequency layer 700. In networks with beamformed DL-PRS, the LMF 120 may determine directional DL-PRS beams for each gNB 110*a-c* which should be received by the UE 105. The directional DL-PRS beams may be selected by the LMF 120 according to a known approximate location for the target UE 105, e.g. as given by the coverage area of the serving or camped-on cell for the UE 105 and/or the RSRP/ECID measurements provided by the UE 105 at stage 2.

At stage 6., the LMF 120 is configured to send an NRPPa PRS Configuration Request message to each of the gNBs 110*a-c* determined at stage 5 including the requested DL-PRS transmission characteristics defining the new DL-PRS configuration(s) determined for that gNB. For example, the LMF 120 can include parameter values defining the new DL-PRS configuration(s) determined for a gNB 110 in the NRPPa PRS Configuration Request message that is sent to that gNB 110. The request may also include a start time for each new DL-PRS configuration and a duration (e.g., as requested by the UE at stage 2 or as determined by the LMF at stage 5). At stage 7., each of the gNBs 110*a-c* may return a response to the LMF 120 indicating whether the new DL-PRS configuration(s) can be supported. If some gNBs 110*a-c* indicate that the new DL-PRS configuration(s) cannot be supported, the LMF 120 may perform stages 15 and 16 to restore the old DL-PRS configurations in each of the gNBs which indicated a new DL-PRS configuration can be supported in order to avoid interference between gNBs 110 which support the new DL-PRS configuration and gNBs 110 which do not. In this case, the LMF 120 may provide the old DL-PRS configurations to the UE at stage 9 instead of the new DL-PRS configurations.

At stage 8., each of the gNBs 110*a-c* which acknowledged support of a new DL-PRS configuration at stage 7 changes from an old DL-PRS configuration to a new DL-PRS configuration either after (or just before) sending the acknowledgment at stage 7 if no start time was provided or at the start time indicated in stage 6. In some cases, the old DL-PRS configuration may correspond to not transmitting a DL-PRS. In some cases, the start time for switching to the new DL-PRS configuration may result in transmitting the new DL-PRS after stage 9 or 10/11. This may typically be the case when the new DL-PRS configuration consists of a single or a few DL-PRS occasions. At stage 9., the LMF 120 sends an LPP Provide Assistance Data message to the target UE 105 to provide the new DL-PRS configurations determined at stage 5 and acknowledged at stage 7. For example, the LMF 120 can include parameter values defining each of the new DL-PRS configurations determined at stage 5 in the LPP Provide Assistance Data message and may indicate the cells, gNBs 110 and/or TRPs to which each DL PRS configuration applies. At stage 10., when the assistance data with the new DL-PRS configuration has been transferred to the UE 105, the LMF 120 returns an Nlmf_Location_DetermineLocation Response towards the AMF 115. The response at stage 10 (or the message at stage 9) may indicate whether the MO-LR Request from stage 2 can be supported (i.e. fulfilled) and may (e.g. if MO-LR support is indicated) include the start time for each new DL-PRS configuration and a duration (e.g., if different as requested by the UE 105 at stage 2 and determined by the LMF 120 at stage 5). The start time and duration for the new DL-PRS configuration may also be referred to as validity time or expiration time etc. for the LPP Provide Assistance Data message including the DL-PRS configuration. If the on-demand DL-PRS request from stage 2 could not be fulfilled, a failure cause may be included in the service operation at stage 10 or in the LPP Provide Assistance Data at stage 9.

At stage 11., the AMF 115 forwards the response from stage 10 to the target UE 105 in the form of an MO-LR response that may indicate whether the MO-LR Request from stage 2 can be supported (i.e. fulfilled) and may include the start time for each new DL-PRS configuration and a duration if received at stage 10 or may include any failure indication received at stage 10.

At stage 12., the target UE 105 acquires and measures the DL-PRS transmitted by the gNBs 110*a-c* according to the new DL-PRS configurations provided at stage 9. For example, the UE 105 may obtain RSTD measurements. At stage 13., the UE 105 determines its location based on the DL-PRS measurements obtained at stage 12 and the assistance data received at stage 9. At stage 14., the UE 105 provides the location estimate to the internal client which requested the location at stage 0. At stage 15., if a duration for the new DL-PRS was not included at stage 6, the LMF 120 may send an NRPPa PRS Configuration Request message to each of the gNBs 110a-c determined at stage 5 and includes a request to restore the old DL-PRS configuration for each gNB 110a-c. The LMF 120 may use the determined duration for the DL-PRS from stage 5 to decide when to perform stage 15. At stage 16., each of the gNBs 110a-c returns a response to the LMF 120 indicating whether the old DL-PRS configuration can be restored. At stage 17., each of the gNBs 110a-c begins transmitting the old DL-PRS configuration either when the duration received in stage 6 expires or after receiving and acknowledging the request to restore the old DL-PRS configuration at stages 15 and 16.

Figure 9A:
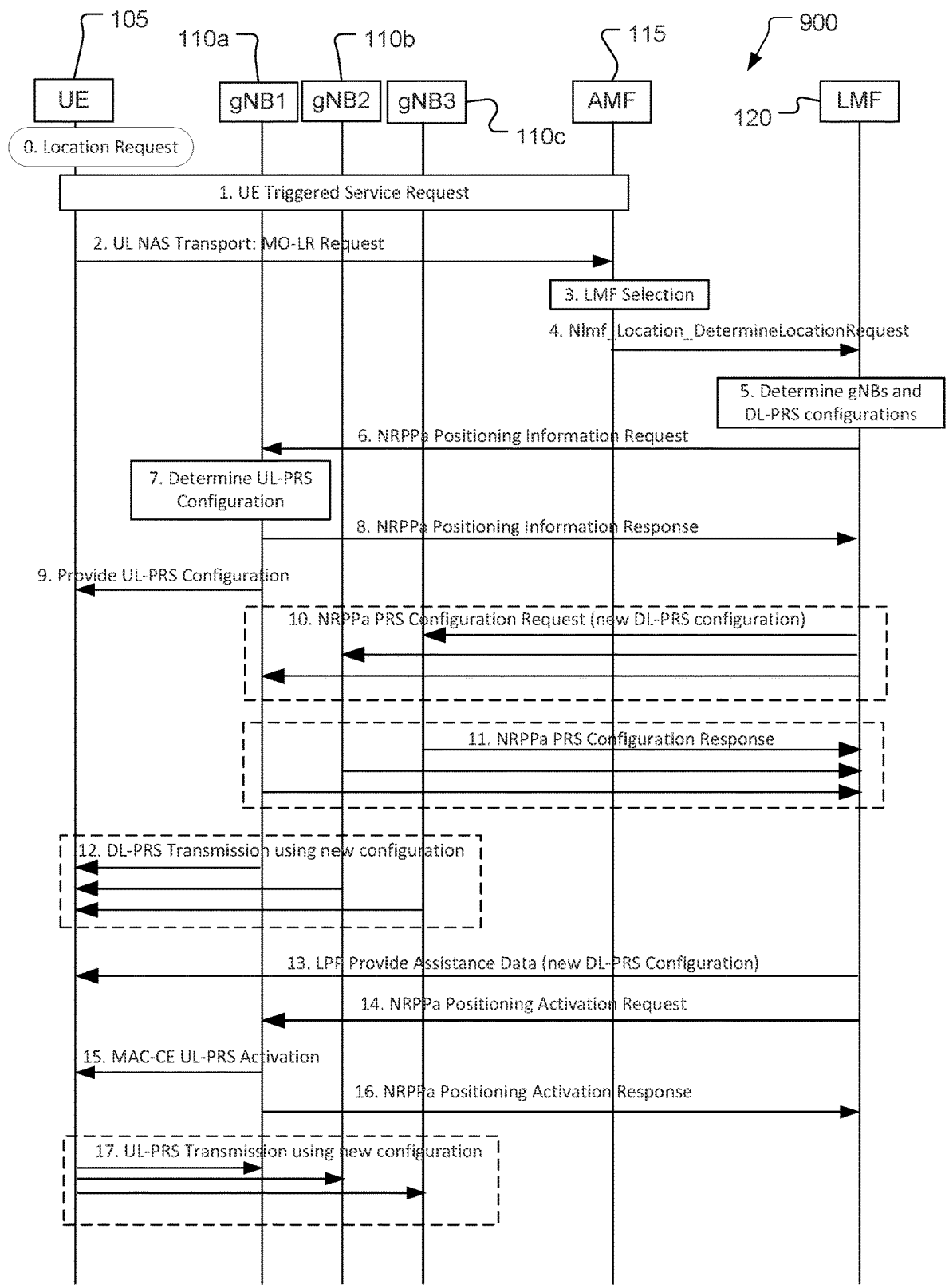
FIGS. 9A and 9B comprise an example message flow diagram for extending mobile-originated location request procedures for enabling on-demand DL-PRS and UL-PRS.
Figure 9B:
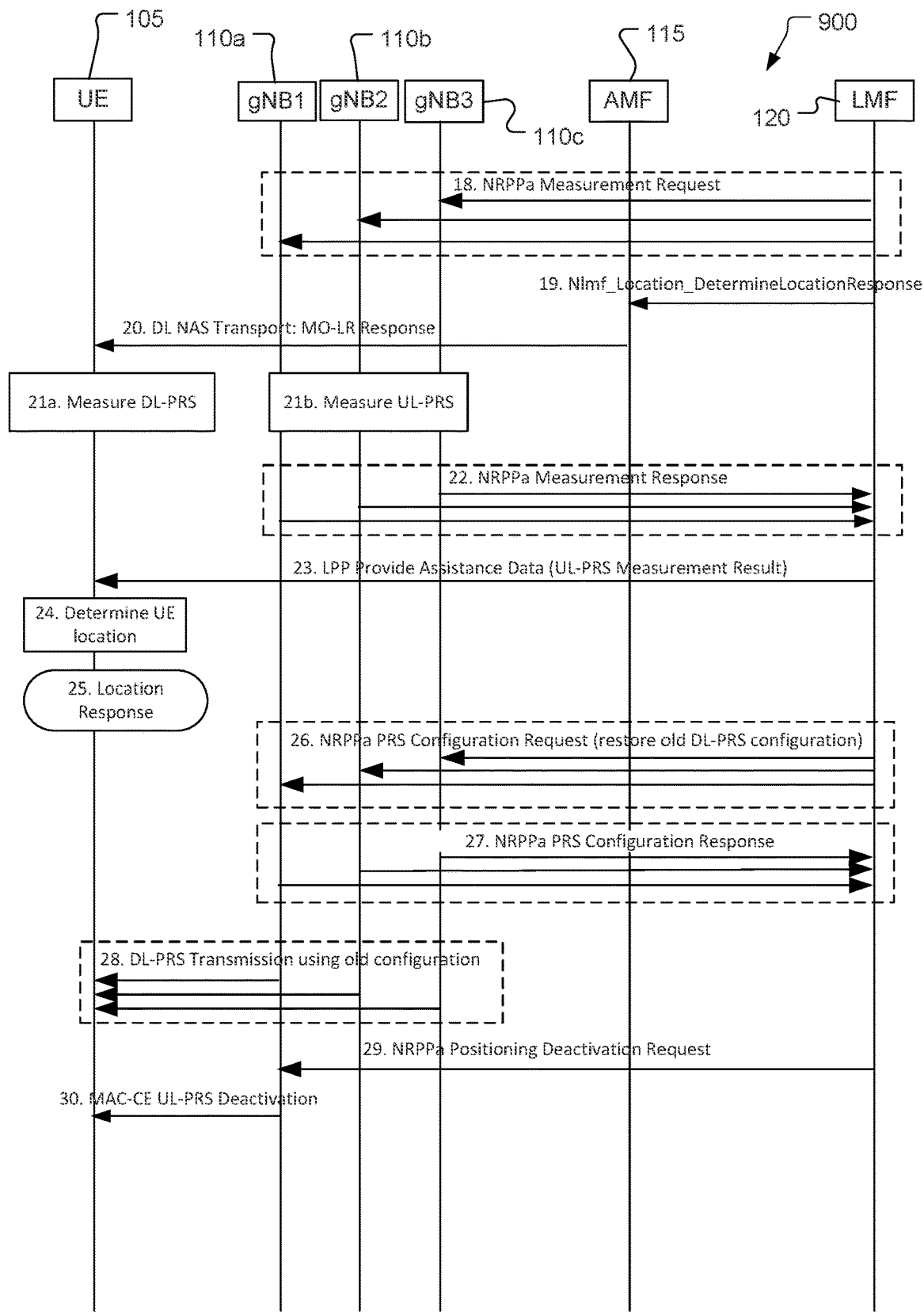

FIGS. 9A and 9B show an example message flow 900 for extending mobile-originated location request procedures for enabling on-demand DL-PRS and UL-PRS. The example message flow 900 includes the UE 105 and three example TRPs 300 such as the first gNB1 110a, gNB2 110b, and the third gNB3 110c, and elements of the core network 140 such as the AMF 115 and the LMF 120. The message flow 900 may be used to extend existing MO-LR procedures for UE triggered on-demand DL-PRS and UL-PRS.

At stage 0., the UE 105 may receive a location request from an internal client (e.g. an App). The UE 105 is configured to determine that a change in DL-PRS transmission and UL-PRS is needed (e.g. increased PRS bandwidth, increased duration of positioning occasions, DL-PRS transmission from more nearby gNBs, etc.) to meet the QoS requirement from the application. At stage 1., if the UE 105 is in CM-IDLE state, the UE 105 may be configured to instigate the UE triggered Service Request as defined in clause 4.2.3.2 of 3GPP TS 23.502 in order to establish a signaling connection with the AMF 115. At stage 2., the UE 105 is configured to send a MO-LR Request message included in an UL NAS TRANSPORT message to the serving AMF 115 including a request for a change in DL-PRS transmission and UL-PRS configuration. The request may include the DL-PRS and UL-PRS capabilities of the UE 105 and parameters for preferred DL-PRS and UL-PRS configurations (e.g. which may include, for each preferred DL-PRS and UL-PRS configuration, a preferred PRS bandwidth, a preferred duration of PRS positioning occasions, preferred PRS beam directions and/or a preferred number of nearby gNBs 110a-c to which this applies). The requested DL-PRS and UL-PRS configuration parameter may be provided in a LPP Request Assistance Data message included in the MO-LR Request. The request for a change to (e.g., increased) PRS transmission may also include a Quality of Service (QoS) indicator, such as a required accuracy of a location estimate and/or a response time indicating when the internal client requires the location estimate. The MO-LR Request message may also include a time duration for how long the requested PRS configurations are required at the UE (e.g., number of seconds or minutes for which the DL-PRS and UL-PRS configurations are required). The MO-LR Request may also include RSRP measurements (e.g., per beam) of DL signals received by the UE (e.g., an E-CID Location Measurement Report) to assist an LMF in determining nearby gNBs and/or beam directions for PRS.

At stage 3., the AMF 115 is configured to select an LMF 120 (e.g. as described in 3GPP TS 23.273, section 5.1.). At stage 4., the AMF 115 invokes an Nlmf_Location_DetermineLocation service operation towards the LMF 120. The service operation may indicate one or more of: (i) a request for assistance data; (ii) a request for on demand DL-PRS and/or UL-PRS; (iii) an MO-LR request. The service operation may also include the MO-LR Request received at stage 2, any LPP messages received at stage 2 that were included in the MO-LR Request at stage 2, and/or a list of assistance data types for which UE 105 has a subscription.

At stage 5., the LMF 120 may first verify that the UE 105 has a subscription to request new DL-PRS and UL-PRS configurations based on the list of assistance data types for which UE 105 has a subscription that were received at stage 4. Then, at stage 5., based on the request in stage 4, the LMF 120 determines a new DL-PRS configuration for nearby gNBs 110a-c (e.g. based on a preferred number of gNBs indicated at stage 2). The determination at stage 5 may also be based on DL-PRS requests received from other UEs as in stage 2 and/or on location procedures for other UEs which occur at about the same time. The new DL-PRS configuration for each gNB 110a-c may use changed (e.g., increased) DL-PRS bandwidth, a changed (e.g., longer) duration of DL-PRS positioning occasions, DL-PRS transmission on new frequencies, and/or a higher frequency of DL-PRS positioning occasions. In an example, the new DL-PRS configuration may be selected from a set of one or more preconfigured sets of DL-PRS configuration parameters. In networks with beamformed DL-PRS, the LMF 120 may determine directional DL-PRS beams for each gNB 110a-c which should be received by the UE 105. The directional DL-PRS beams may be selected by the LMF 120 according to a known approximate location for the target UE 105, e.g. as given by the coverage area of the serving or camped-on cell for the UE and/or the RSRP/ECID measurements provided by the UE 105 at stage 2. As an option at stage 5, the LMF 120 may determine, adjust or change one or more of parameters for a preferred UL-PRS configuration that may, in some cases, have been sent by the UE 105 at stage 2 (and received by the LMF 120 at stage 4). For example, the LMF 120 may determine or change such UL-PRS parameters as a preferred UL-PRS bandwidth and/or a preferred duration of UL-PRS positioning occasions, e.g. if the determination or change is indicated as supported by the UL-PRS capabilities of the UE 105 sent at stage 2.

At stage 6., the LMF 120 sends a NRPPa Positioning Information Request message to the serving gNB 110a to request an UL-PRS configuration for the target UE 105. The NRPPa Positioning Information Request message includes the desired UL-PRS configuration parameters from stage 2 or from stage 5 if the parameters were determined or changed at stage 5.

At stage 7., the serving gNB 110a of the target UE 105 determines an UL-PRS configuration according to the parameters received at stage 6. If the request can partially be fulfilled, the gNB 110a selects the possible configuration parameter which may be different compared to the requested parameter at stage 6. At stage 8., the serving gNB 110a of the target UE 105 provides the UL-PRS configuration parameter to the LMF 120. At stage 9., the serving gNB 110a of the target UE 105 provides the UL-PRS configuration parameters to the UE 105 in an Radio Resource Control (RRC) message. In an example, stages 6.-9. may not be needed if the UL-PRS Configuration is selected by the LMF 120 at stage 5 as well (in addition to the DL-PRS selection). In that case the UL-PRS configuration parameter may be provided to the UE 105 at stage 13. At stage 10., the LMF 120 sends an NRPPa PRS Configuration Request message to each of the gNBs 110a-c determined at stage 5 including the requested DL-PRS transmission characteristics defining the new DL-PRS configuration determined for that gNB. The request may also include a start time for each new DL-PRS configuration and a duration (e.g., as requested by the UE at stage 2 or determined by the LMF 120 at stage 5). At stage 11., each of the gNBs 110a-c return a response to the LMF 120 indicating whether the new DL-PRS configuration can be supported. If some gNBs indicate that the new DL-PRS configuration cannot be supported, the LMF 120 may perform stages 26 and 27 to restore the old DL-PRS configurations in each of the gNBs 110a-c which indicated a new DL-PRS configuration can be supported in order to avoid interference between gNBs which support the new DL-PRS configuration and gNBs which do not. In this case, the LMF 120 may provide the old DL-PRS configurations to the UE at stage 13 instead of the new DL-PRS configurations.

At stage 12., each of the gNBs 110a-c which acknowledged support of a new DL-PRS configuration at stage 11 changes from an old DL-PRS configuration to a new DL-PRS configuration either after (or just before) sending the acknowledgment at stage 11 if no start time was provided or at the start time indicated in stage 10. In some cases, the old DL-PRS configuration may correspond to not transmitting a DL-PRS. At stage 13., the LMF 120 sends an LPP Provide Assistance Data message to the target UE 105 to provide the new DL-PRS configurations (e.g. to provide parameters defining these configurations) determined at stage 5 and acknowledged at stage 11. At stage 14., the LMF 120 sends a NRPPa Positioning Activation Request message to the serving gNB 110a of the target UE 105 to request activation of the UL-PRS in the UE 105 according to one or more configurations provided to the UE 105 at stage 9. At stage 15., the serving gNB 110a sends a MAC Control Element to the UE 105 to activate the UL-PRS as requested at stage 14. If a start time was provided at stage 14, the serving gNB 110a sends this command at the requested start time. At stage 16., if the UL-PRS has been successfully activated, the serving gNB 110a returns a NRPPa Positioning Activation Response message to the LMF 120. If the requested start time provided at Stage 14 cannot be fulfilled, the serving gNB 110 may determine a different start time and provide the selected start time to the LMF 120. At stage 17., the target UE 105 transmits UL-PRS according to the activated configuration at stage 15.

As depicted in FIG. 9B, at stage 18., the LMF 120 sends a NRPPa Measurement Request message to the gNBs 110a-c selected at stage 5 to request UL-PRS measurements (e.g., gNB Rx-Tx Time Difference Measurements). At stage 19., when the assistance data with the new DL-PRS configuration has been transferred to the UE 105 and the NRPPa UL-PRS measurement request has been activated at the gNBs 110a-c, the LMF 120 returns an Nlmf_Location_DetermineLocation Response towards the AMF 115 that may indicate success or failure of the request sent by AMF 115 at stage 4. If the on-demand PRS request from stage 2 could not be fulfilled, a failure cause may be included in the service operation at stage 19 or in the LPP Provide Assistance Data at stage 13. At stage 20., the AMF 115 sends an MO-LR Response message to the target UE 105 and may indicate success or failure to support the MO-LR Request as indicated at stage 19 and may include any failure cause received at stage 19.

Alternatively, stages 19 and 20 may occur at later stages in the procedure of FIG. 9A/B. In one alternative, stages 19 and 20 may occur after stage 23 when both, the LPP Provide Assistance Data message including the DL-PRS configuration at stage 13 and the LPP Provide Assistance Data message with the UL-PRS measurement result at stage 23 have been provided to the UE 105. In another alternative, stages 19 and 20 may occur after stage 30 when the LPP Provide Assistance Data message including the DL-PRS configuration at stage 13 and the LPP Provide Assistance Data message with the UL-PRS measurement result at stage 23 and the UL-PRS Deactivation at stage 30 occurred.

At stage 21a., the target UE 105 acquires and measures the DL-PRS transmitted by the gNBs 110a-c according to the new DL-PRS configurations provided at stage 13. At stage 21b, the gNBs 110a-c which received the measurement request at stage 18 acquire and measure the UL-PRS transmitted by the target UE 105 at stage 17.

In an example, the LMF 120 may determine the start time for switching to the new DL-PRS configuration (stage 12) and for activation of UL-PRS transmission (stage 17) such that stages 12 and 17 happen at about the same time (e.g., in case of a single or a few UL-PRS and DL-PRS occasions are transmitted/requested). For example, the start times may be selected such that stages 12 and 17 happen together (e.g. after stage 20). At stage 22., the gNBs 110a-c provide the UL-PRS measurements to the LMF 120. At stage 23., the LMF 120 forwards the UL-PRS measurements received at stage 22 to the target UE 105 in a LPP Provide Assistance Data message.

At stage 24., the UE 105 is configured to determine a location based on the DL-PRS measurements obtained at stage 21a and the UL-PRS measurements received at Stage 23, and the assistance data received at stage 13. At stage 25., the UE 105 may provide the location estimate to the internal client which requested the location at stage 0.

At stage 26., if a duration for the new DL-PRS was not included at stage 10, the LMF 120 may send an NRPPa PRS Configuration Request message to each of the gNBs 110a-c determined at stage 5 and includes a request to restore the old DL-PRS configuration for each gNB 110a-c. The LMF 120 may use the determined duration for the DL-PRS from stage 5 to decide when to perform stage 26. At stage 27., each of the gNBs 110a-c returns a response to the LMF 120 indicating whether the old DL-PRS configuration can be restored. At stage 28., each of the gNBs 110a-c may begin transmitting the old DL-PRS configuration either when the duration received in stage 10 expires or after receiving and acknowledging the request to restore the old DL-PRS configuration at stages 26 and 27. At stage 29., the LMF 120 may send a NRPPa Positioning Deactivation Request message to the serving gNB 110a of the target UE 105 to request a deactivation of the UE UL-PRS transmission. At stage 30., the serving gNB 110a sends a MAC Control Element to the target UE to deactivate UL-PRS transmission as requested at Stage 29.

Figure 10A:
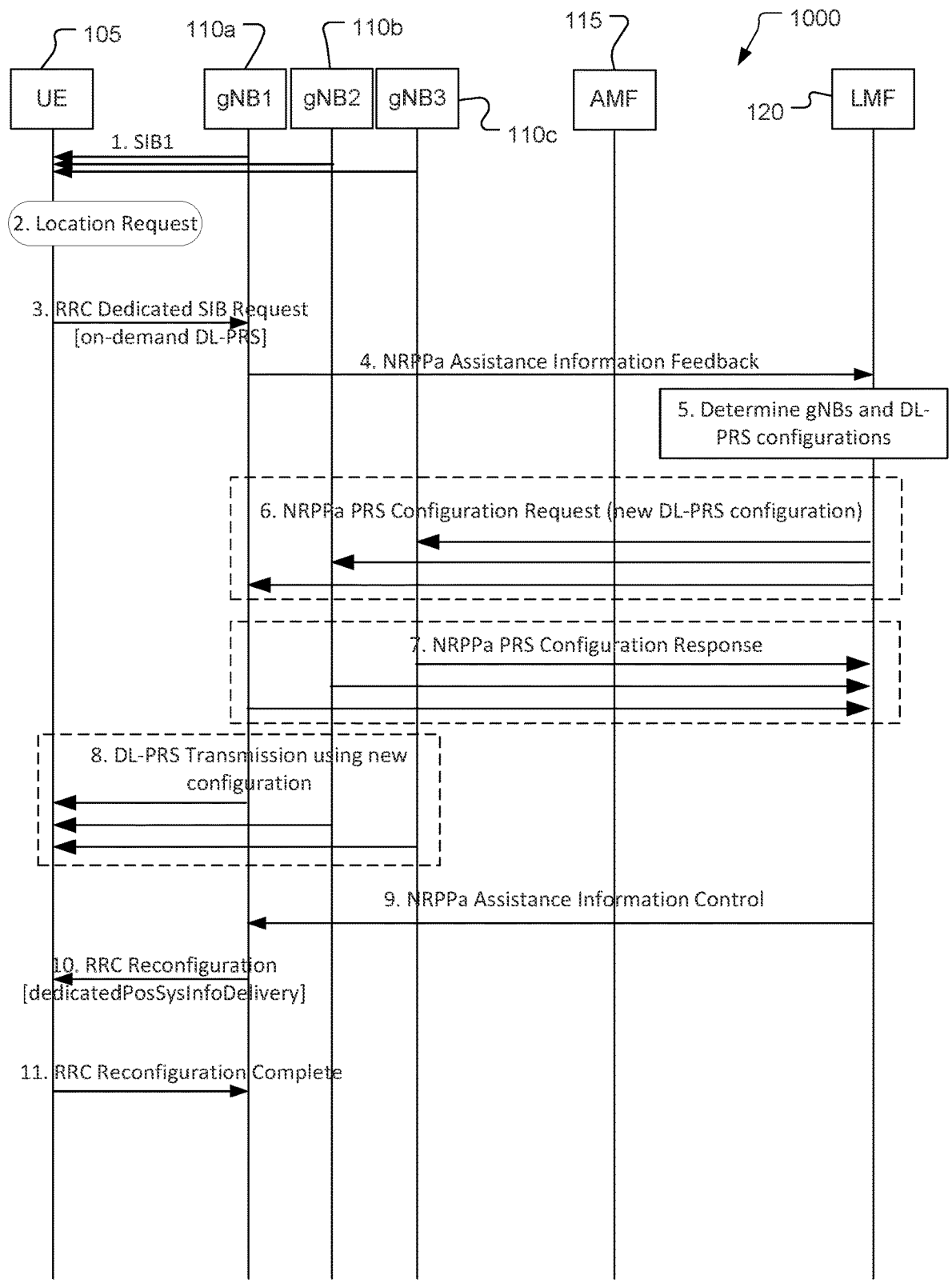
FIGS. 10A and 10B comprise an example message flow diagram for extending on-demand system information procedures for enabling on-demand DL-PRS.
Figure 10B:
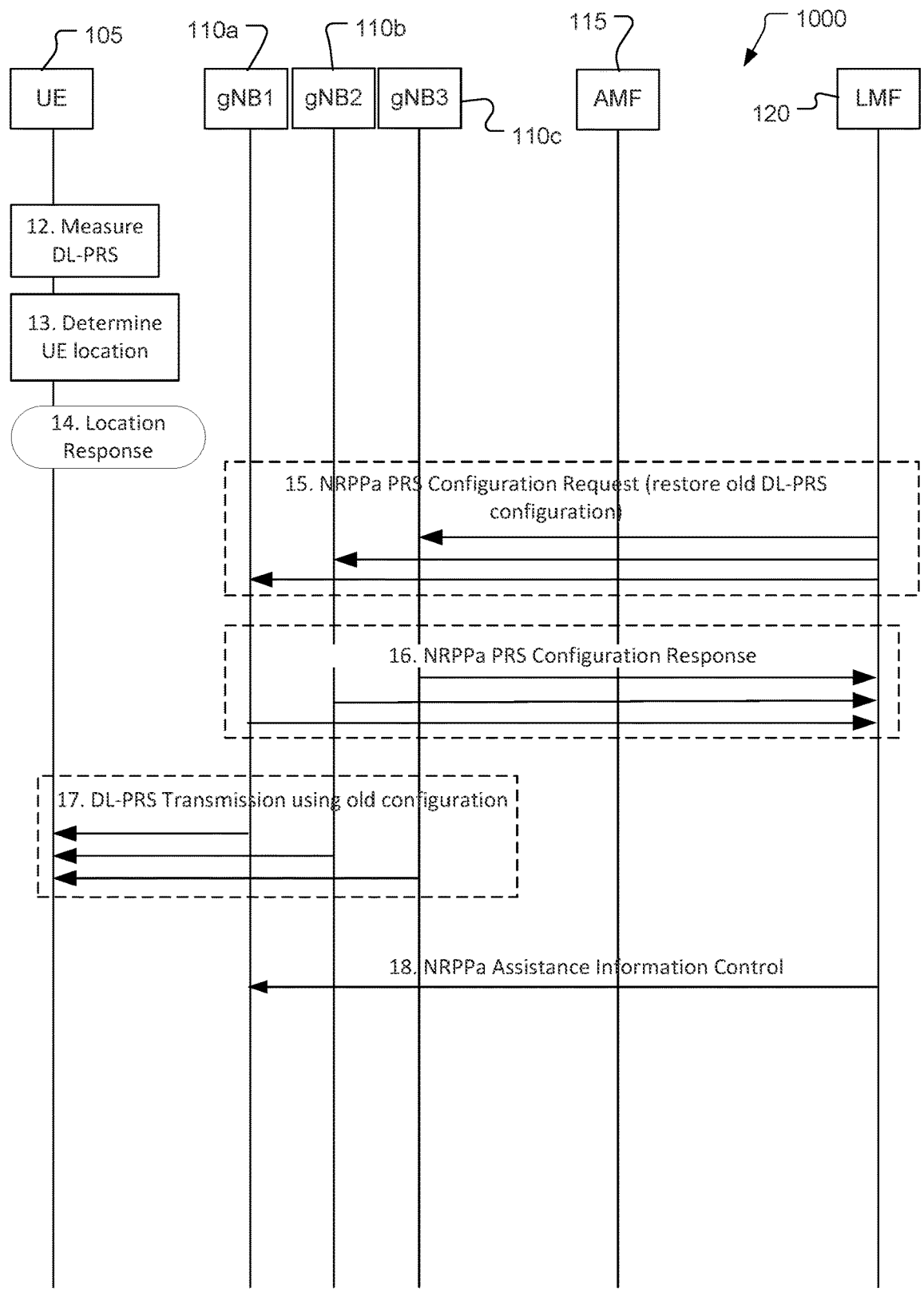

Referring to FIGS. 10A and 10B, an example message flow 1000 for extending on-demand system information procedures for enabling on-demand DL-PRS is shown. The example message flow 1000 includes the UE 105 and three example TRPs 300 such as the first gNB1 110a, gNB2 110b, and the third gNB3 110c, and elements of the core network 140 such as the AMF 115 and the LMF 120. The message flow 1000 may be used to extend an on-demand System Information (SI) procedure for requesting broadcast assistance data. Positioning Assistance Data may be provided via LPP point-to-point (unicast) or via positioning SI (broadcast). The positioning SI messages containing the DL-PRS assistance data may be broadcast periodically or when there is a request from the UE. In an example, the core network 140 may be configured to decide whether the requested broadcast assistance data (i.e., positioning System Information Blocks (posSIBs)) are provided using broadcast or provided point-to-point (unicast) via RRC Reconfiguration messages. This procedure may be adapted for on-demand PRS. For example, a broadcast message (e.g., System Information Block 1 (SIB1) or a broadcast assistance data element, etc.) may include an indicator whether on-demand PRS is supported by the network or not. For example, the broadcast message may indicate: on-demand-prs ENUMERATED {dl-prs, ul-prs, ul-and-dl-prs}.

This indicator (or equivalent indicator(s)) may also be used with the example message flows 800 and 900 described above to indicate to the UE that on-demand PRS is supported via the MO-LR procedure in the network.

Referring to FIG. 10A, at stage 1., the gNBs 110a-c in the network broadcast SIB1 which may include an indicator whether on-demand DL-PRS is available/supported by the gNB or not. The UE 105 may receive SIB1 from the serving gNB 110a. At stage 2., the UE 105 is configured to receive a location request from an internal client (e.g. an App). The UE 105 may determine that a change in DL-PRS transmission is needed (e.g. increased DL-PRS bandwidth, increased duration of positioning occasions (e.g., increased PRS Resource Repetition Factor), DL-PRS transmission from more nearby gNBs, etc.) to meet the QoS requirement from the application. At stage 3., the UE 105 sends a RRC Dedicated SIB Request message to the serving gNB to request on-demand DL-PRS (e.g., a request for a change in DL-PRS transmission). The request may include the DL-PRS capabilities of the UE 105 and parameters for preferred DL-PRS configurations (which may include a preferred DL-PRS bandwidth, a preferred duration of DL-PRS positioning occasions, preferred DL-PRS beam directions for certain gNBs if known by the UE) and a preferred number of nearby gNBs to which this applies. The request for increased DL-PRS transmission may also include a Quality of Service (QoS) indicator, such as required accuracy of the location estimate and/or a response time indicating when the internal client requires the location estimate. The RRC Dedicated SIB Request message may also include a time duration for how long the requested DL-PRS configuration is required at the UE (e.g., number of seconds or minutes for which the DL-PRS configuration is required). The RRC Dedicated SIB Request message may also include RSRP measurements (e.g., per beam) of DL signals received by the UE 105 (e.g., a RRC Measurement Report) to assist an LMF 120 in determining nearby gNBs and/or beam directions for DL-PRS. At stage 4., the serving gNB 110a sends a NRPPa Assistance Information Feedback message to the LMF 120. The message includes the on-demand DL-PRS request received from the UE 105 at stage 3.

At stage 5., based on the request in stage 4 the LMF 120 is configured to determine a new DL-PRS configuration for nearby gNBs 110a-c (e.g. based on a preferred number of gNBs indicated at stage 3). The determination at stage 5 may also be based on DL-PRS requests received from other UEs as in stage 3 and/or on location procedures for other UEs which occur at about the same time. The new DL-PRS configuration for each gNB 110a-c may use changed (e.g., increased) DL-PRS bandwidth, a changed (e.g., longer) duration of DL-PRS positioning occasions, DL-PRS transmission on new frequencies, and/or a higher frequency of DL-PRS positioning occasions. In some cases, the new DL-PRS configuration may be selected from a set of one or more preconfigured sets of DL-PRS configuration parameters. In networks with beamformed DL-PRS, the LMF 120 may determine directional DL-PRS beams for each gNB which should be received by the UE 120. The directional DL-PRS beams may be selected by the LMF 120 according to a known approximate location for the target UE 105, e.g. as given by the coverage area of the serving or camped-on cell for the UE 105 and/or the RSRP measurements provided by the UE at Stage 3.

At stage 6., the LMF 120 sends an NRPPa PRS Configuration Request message to each of the gNBs 110a-c determined at stage 5 including the requested DL-PRS transmission characteristics defining the new DL-PRS configuration determined for that gNB. The request may also include a start time for each new DL-PRS configuration and a duration (e.g., as requested by the UE 105 at Stage 3 or determined by the LMF 120 at stage 5). At stage 7., each of the gNBs 110a-c returns a response to the LMF 120 indicating whether the new DL-PRS configuration can be supported. If some gNBs 110a-c indicate that the new DL-PRS configuration cannot be supported, the LMF 120 may perform stages 15 and 16 to restore the old DL-PRS configurations in each of the gNBs 110a-c which indicated a new DL-PRS configuration can be supported in order to avoid interference between gNBs which support the new DL-PRS configuration and gNBs which do not. In this case, the LMF 120 would provide the old DL-PRS configurations to the UE 105 at stage 9 and 10 instead of the new DL-PRS configurations.

At stage 8., each of the gNBs 110a-c which acknowledged support of a new DL-PRS configuration at stage 7 changes from an old DL-PRS configuration to a new DL-PRS configuration either after (or just before) sending the acknowledgment at stage 7 if no start time was provided or at the start time indicated in stage 6. In some cases, the old DL-PRS configuration may correspond to not transmitting a DL-PRS. At stage 9., the LMF 120 is configured to send a NRPPa Assistance Information Control message to the serving gNB 110a to provide the new DL-PRS configurations determined at stage 5 and acknowledged at stage 7. The DL-PRS configuration information may be provided in form of a posSIB (i.e., using the parameter and encoding as defined for broadcast assistance data). At stage 10., the serving gNB 110a is configured to provide the DL-PRS configuration information received at stage 9 to the UE 105 in a dedicated (uni-cast) RRC Reconfiguration message. The dedicatedPosSysInfoDelivery may consist of an OCTET STRING containing the DL-PRS configuration in posSIB format as received at stage 9. At stage 11., the UE 105 acknowledges the RRC Reconfiguration and returns a RRC Reconfiguration Complete message to the serving gNB.

Referring to FIG. 10B, at stage 12., the target UE 105 acquires and measures the DL-PRS transmitted by the gNBs according to the new DL-PRS configurations provided at stage 10. For example, the UE 105 may obtain RSTD measurements. At stage 13., the UE 105 determines a location based on the DL-PRS measurements obtained at stage 12 and the assistance data received at stage 10. At stage 14., the UE 105 is configured to provide the location estimate to the internal client which requested the location at stage 2.

At stage 15., if a duration for the new DL-PRS was not included at stage 6, the LMF 120 may send an NRPPa PRS Configuration Request message to each of the gNBs 110a-c determined at stage 5 and includes a request to restore the old DL-PRS configuration for each gNB. The LMF 120 may use the determined duration for the DL-PRS from stage 5 to decide when to perform stage 15. At stage 16., each of the gNBs 110a-c returns a response to the LMF 120 indicating whether the old DL-PRS configuration can be restored. At stage 17., each of the gNBs 110a-c may begin transmitting the old DL-PRS configuration either when the duration received in stage 6 expires or after receiving and acknowledging the request to restore the old DL-PRS configuration at stages 15 and 16. At stage 18., the LMF 120 may be configured to send a NRPPa Assistance Information Control message to the serving gNB including the posSIB information for the restored DL-PRS configuration.

Figure 11A:
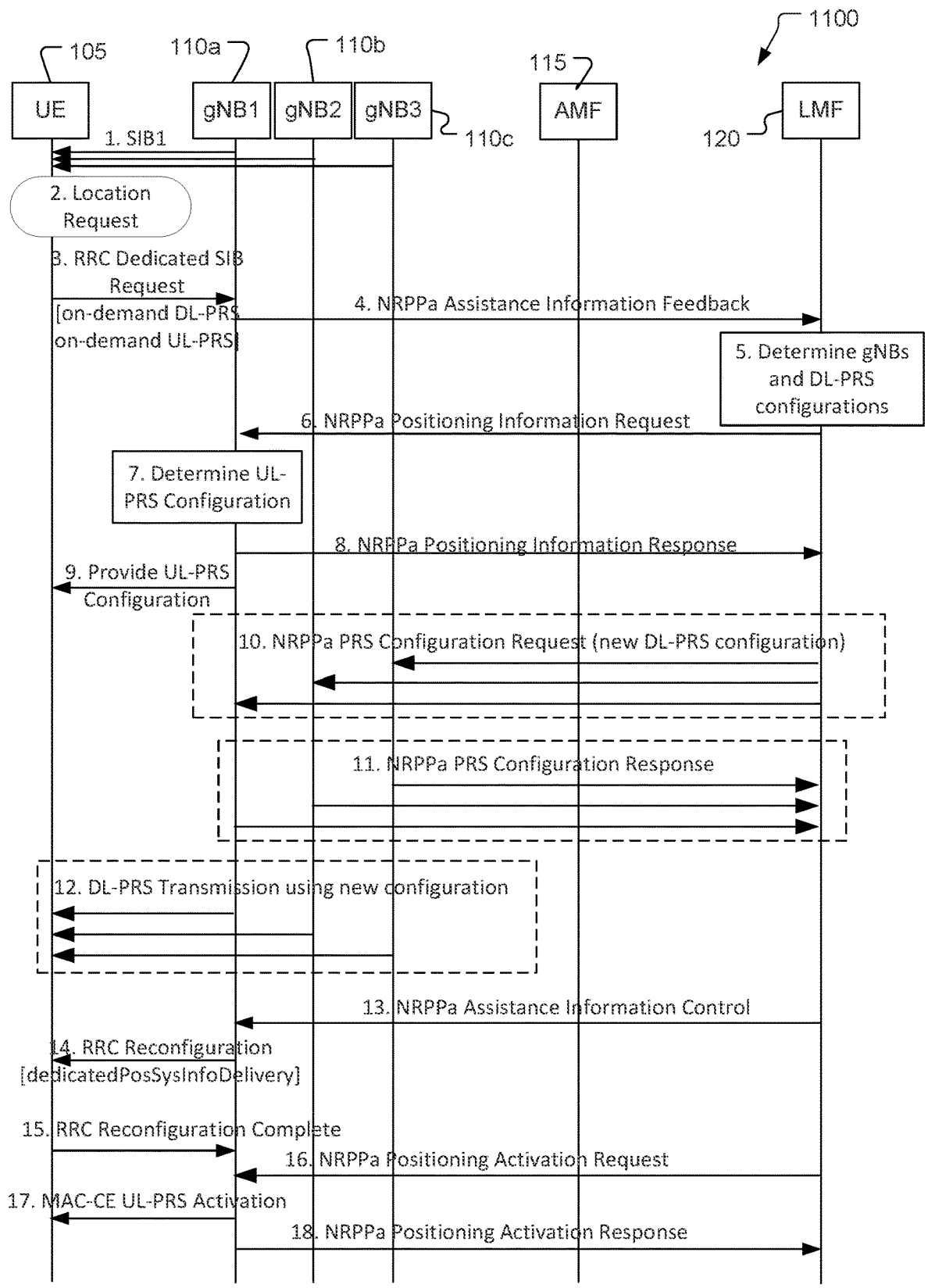
FIGS. 11A and 11B comprise an example message flow diagram for extending on-demand system information procedures for enabling on-demand DL-PRS and UL-PRS.
Figure 11B:
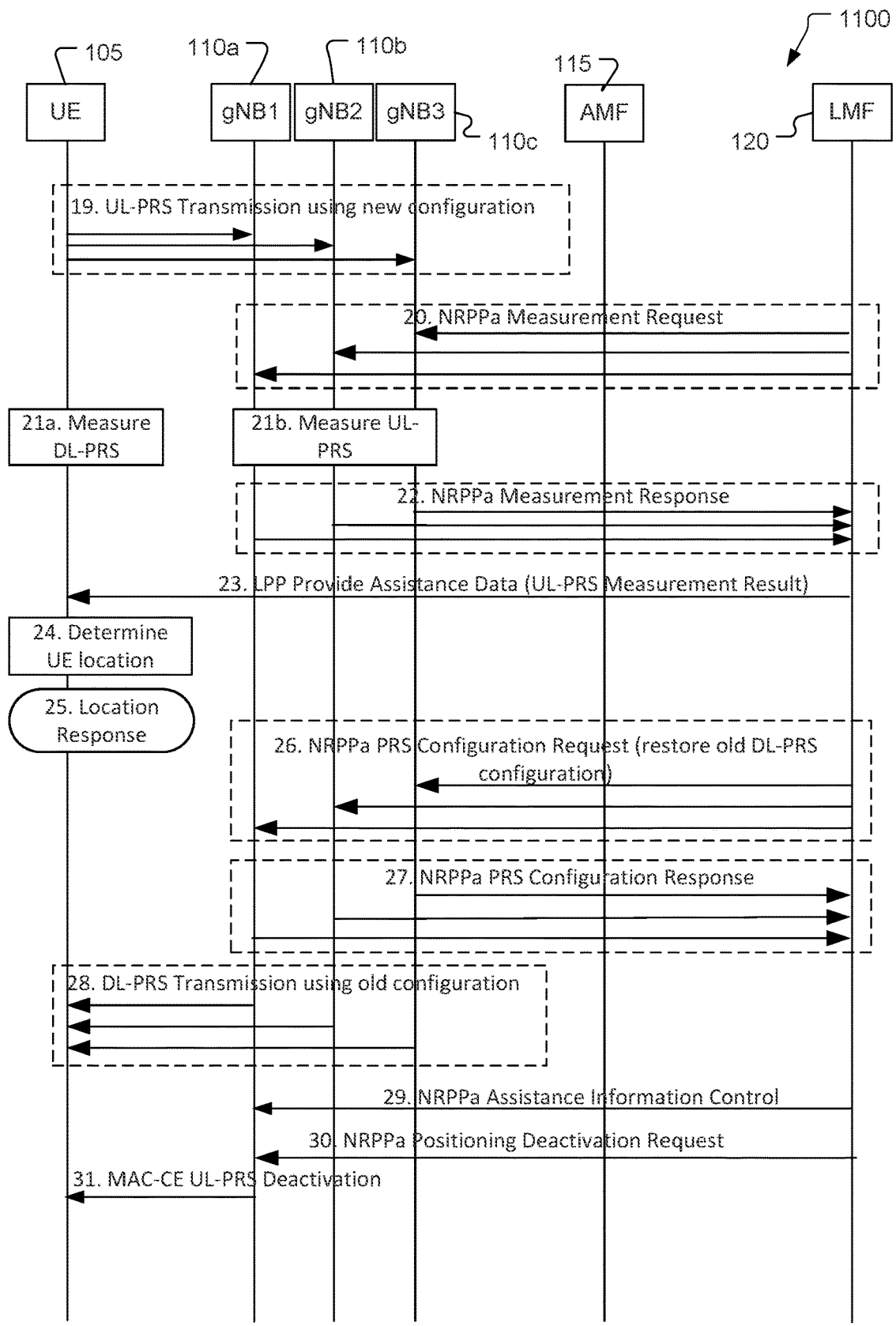

Referring to FIGS. 11A and 11B, an example message flow 1100 for extending on-demand system information procedures for enabling on-demand DL-PRS and UL-PRS is shown. The example message flow 1100 includes the UE 105 and three example TRPs 300 such as the first gNB1 110a, gNB2 110b, and the third gNB3 110c, and elements of the core network 140 such as the AMF 115 and the LMF 120. The message flow 1100 may be used to extend an on-demand System Information (SI) procedure for requesting broadcast assistance data.

Referring to FIG. 11A, at stage 1., the gNBs 110a-c in the network broadcast SIB1 which may include an indicator whether on-demand DL- and UL-PRS is available/supported by the gNB or not. The UE 105 may receive SIB1 from the serving gNB 110a. At stage 2., the UE 105 may receive a location request from an internal client (e.g. an App). The UE 105 may determine that a change in DL-PRS transmission and UL-PRS is needed (e.g. increased PRS bandwidth, increased duration of positioning occasions, DL-PRS transmission from more nearby gNBs, etc.) to meet the QoS requirement from the application. At stage 3., the UE 105 sends a RRC Dedicated SIB Request message to the serving gNB 110a to request on-demand DL-PRS transmission and UL-PRS configuration. The request may include the DL-PRS and UL-PRS capabilities of the UE and parameters for preferred DL-PRS and UL-PRS configurations (which may include a preferred PRS bandwidth, a preferred duration of PRS positioning occasions, preferred PRS beam directions and a preferred number of nearby gNBs to which this applies). The request for a change in PRS transmission may also include a Quality of Service (QoS) indicator, such as required accuracy of the location estimate and/or a response time indicating when the internal client requires the location estimate. The RRC Dedicated SIB Request message may also include a time duration for how long the requested PRS configurations are required at the UE 105 (e.g., number of seconds or minutes for which the DL-PRS and UL-PRS configurations are required). The RRC Dedicated SIB Request message may also include RSRP measurements (e.g., per beam) of DL signals received by the UE 105 (e.g., a RRC Measurement Report) to assist an LMF 120 in determining nearby gNBs and/or beam directions for PRS.

At stage 4., the serving gNB 110a sends a NRPPa Assistance Information Feedback message to the LMF 120. The message includes the on-demand DL-PRS and UL-PRS request received from the UE 105 at stage 3. At stage 5., based on the request in stage 4 the LMF 120 is configured to determine a new DL-PRS configuration for nearby gNBs (e.g. based on a preferred number of gNBs indicated at stage 3). The determination at stage 5 may also be based on DL-PRS requests received from other UEs as in stage 3 and/or on location procedures for other UEs which occur at about the same time. The new DL-PRS configuration for each gNB may use increased DL-PRS bandwidth, a longer duration of DL-PRS positioning occasions, DL-PRS transmission on new frequencies, and/or a higher frequency of DL-PRS positioning occasions. In some cases, the new DL-PRS configuration may be selected from a set of one or more preconfigured sets of DL-PRS configuration parameters. In networks utilizing beamformed DL-PRS, the LMF 120 may determine directional DL-PRS beams for each gNB which should be received by the UE 105. The directional DL-PRS beams may be selected by the LMF 120 according to a known approximate location for the target UE 105, e.g. as given by the coverage area of the serving or camped-on cell for the UE 105 and/or the RSRP measurements provided by the UE 105 at stage 3. At stage 6., the LMF 120 sends a NRPPa Positioning Information Request message to the serving gNB 110a to request an UL-PRS configuration for the target UE 105. The NRPPa Positioning Information Request message includes the desired UL-PRS configuration parameter from stage 3. At stage 7., the serving gNB 110a of the target UE 105 determines an UL-PRS configuration according to the parameters received at stage 6. If the request can partially be fulfilled, the gNB 110a selects the possible configuration parameter which may be different compared to the requested parameter at stage 6. At stage 8., the serving gNB 110a of the target UE 105 provides the UL-PRS configuration parameter to the LMF 120. At stage 9., the serving gNB 110a of the target UE 105 provides the UL-PRS configuration parameter to the UE 105 in an RRC message. In an embodiment, stages 6.-9. may not be needed if the UL-PRS Configuration is selected by the LMF 120 at stage 5 as well (in addition to the DL-PRS selection). In that case the UL-PRS configuration parameter may be provided to the UE 105 at stage 13/14.

At stage 10., the LMF 120 sends an NRPPa PRS Configuration Request message to each of the gNBs 110a-c determined at stage 5 and includes the new DL-PRS configuration determined for that gNB. The request may also include a start time for each new DL-PRS configuration and a duration (e.g., as requested by the UE 105 at stage 3 or determined by the LMF 120 at stage 5). At stage 11., each of the gNBs 110a-c return a response to the LMF 120 indicating whether the new DL-PRS configuration can be supported. If some gNBs indicate that the new DL-PRS configuration cannot be supported, the LMF 120 may perform stages 26 and 27 to restore the old DL-PRS configurations in each of the gNBs 110a-c which indicated a new DL-PRS configuration can be supported in order to avoid interference between gNBs which support the new DL-PRS configuration and gNBs which do not. In this case, the LMF 120 may provide the old DL-PRS configurations to the UE 105 at stage 13/14 instead of the new DL-PRS configurations. At stage 12., each of the gNBs 110a-c which acknowledged support of a new DL-PRS configuration at stage 11 changes from an old DL-PRS configuration to a new DL-PRS configuration either after (or just before) sending the acknowledgment at stage 11 if no start time was provided or at the start time indicated in stage 10. In some cases, the old DL-PRS configuration may correspond to not transmitting a DL-PRS. At stage 13., the LMF 120 sends a NRPPa Assistance Information Control message to the serving gNB 110a to provide the new DL-PRS configurations determined at stage 5 and acknowledged at stage 11. The DL-PRS configuration information may be provided in form of a posSIB (i.e., using the parameter and encoding as defined for broadcast assistance data).

At stage 14., the serving gNB 110a may provide the DL-PRS configuration information received at stage 13 to the UE in a dedicated (uni-cast) RRC Reconfiguration message. The dedicatedPosSysInfoDelivery may consist of an OCTET STRING containing the DL-PRS configuration in posSIB format as received at stage 13. At stage 15., the UE 105 acknowledges the RRC Reconfiguration and returns a RRC Reconfiguration Complete message to the serving gNB 110a. At stage 16., the LMF 120 sends a NRPPa Positioning Activation Request message to the serving gNB 110a of the target UE 105 to request activation of the UL-PRS in the UE 105 according to one or more configurations provided to the UE 105 at stage 9. At stage 17., the serving gNB 110a may send a MAC Control Element to the UE 105 to activate the UL-PRS as requested at stage 16. If a start time was provided at stage 16, the serving gNB 110*a* may send this command at the requested start time. At stage 18., if the UL-PRS has been successfully activated, the serving gNB 110*a* returns a NRPPa Positioning Activation Response message to the LMF 120. If the requested start time provided at stage 16 cannot be fulfilled, the serving gNB 110*a* may determine a different start time and provide the selected start time to the LMF 120.

The message flow 1100 continues in FIG. 11B and at stage 19., the target UE 105 is configured to transmit UL-PRS according to the activated configuration at stage 17. At stage 20., the LMF 120 sends a NRPPa Measurement Request message to the gNBs 110*a-c* selected at stage 5 to request UL-PRS measurements (e.g., gNB Rx-Tx Time Difference Measurements). At stage 21a., the target UE acquires and measures the DL-PRS transmitted by the gNBs according to the new DL-PRS configurations provided at stage 14. At stage 21b., the gNBs 110*a-c* which received the measurement request at stage 20 acquire and measure the UL-PRS transmitted by the target UE 105 at stage 19. At stage 22., the gNBs 110*a-c* may provide the UL-PRS measurements to the LMF 120. In an example, the LMF 120 may determine the start time for switching to the new DL-PRS configuration (stage 12) and for activation of UL-PRS transmission (stage 19) such that stages 12 and 19 happen at about the same time (e.g., in case of a single or a few UL-PRS and DL-PRS occasions are transmitted/requested). For example, the start times may be selected such that stages 12 and 19 happen together (e.g. after stage 20).

In an embodiment, at stage 23., the LMF 120 may forward the UL-PRS measurements received at stage 22 to the target UE 105 in a LPP Provide Assistance Data message. At stage 24., the UE 105 may be configured to determine a location based on the DL-PRS measurements obtained at stage 21a and the UL-PRS measurements received at stage 23, and the assistance data received at stage 14. At stage 25., the UE 105 may be configured to provide the location estimate to the internal client which requested the location at stage 2.

At stage 26., if a duration for the new DL-PRS was not included at stage 10, the LMF 120 may send an NRPPa PRS Configuration Request message to each of the gNBs 110*a-c* determined at stage 5 and includes a request to restore the old DL-PRS configuration for each gNB. The LMF 120 may use the determined duration for the DL-PRS from stage 5 to decide when to perform stage 26. At stage 27., each of the gNBs 110*a-c* may return a response to the LMF 120 indicating whether the old DL-PRS configuration can be restored. At stage 28., each of the gNBs 110*a-c* begin transmitting the old DL-PRS configuration either when the duration received in stage 10 expires or after receiving and acknowledging the request to restore the old DL-PRS configuration at stages 26 and 27. At stage 29., the LMF 120 may send a NRPPa Assistance Information Control message to the serving gNB including the posSIB information for the restored DL-PRS configuration. At stage 30., the LMF 120 may send a NRPPa Positioning Deactivation Request message to the serving gNB 110*a* of the target UE to request a deactivation of the UE UL-PRS transmission. At stage 31., the serving gNB 110*a* may send a MAC Control Element to the target UE 105 to deactivate UL-PRS transmission as requested at stage 30.

Figure 12:
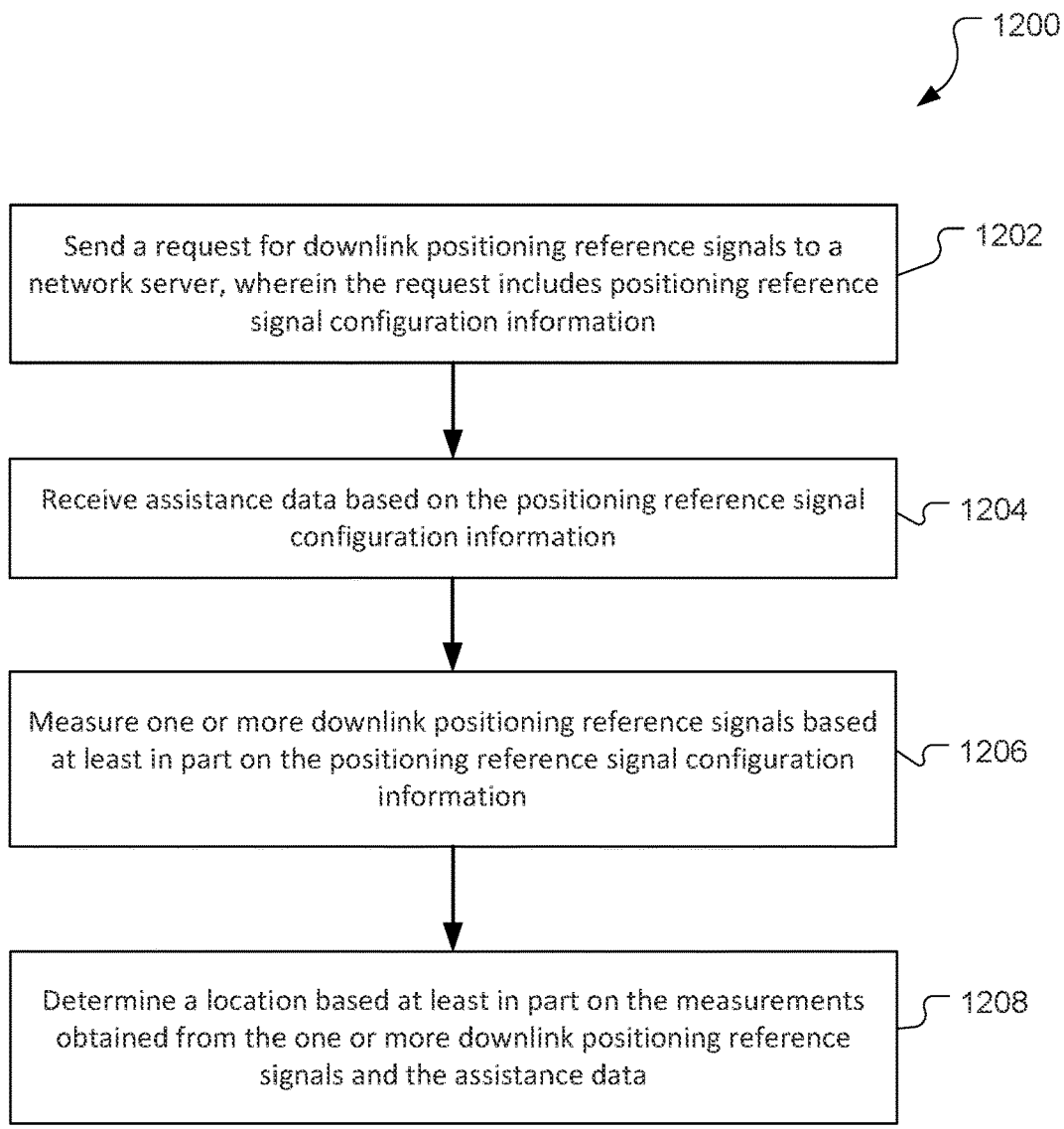
FIG. 12 is a process flow for an example method for determining a location of a mobile device with on-demand positioning reference signals.

Referring to FIG. 12, with further reference to FIGS. 1-11B, a method 1200 for determining a location of a mobile device with on-demand positioning reference signals includes the stages shown. The method 1200 is, however, an example and not limiting. The method 1200 may be altered, e.g., by having stages added, removed, rearranged, combined, performed concurrently, and/or having single stages split into multiple stages. The method 1200 may be performed by a UE such as the UE 105 in FIG. 1 or the UE 200 in FIG. 2.

At stage 1202, the method includes sending a request for downlink positioning reference signals to a network server (e.g. an AMF 115 or LMF 120), wherein the request includes positioning reference signal configuration information. A mobile device such as the UE 200 is a means for sending (e.g., transmitting) a request for downlink positioning reference signals. In an embodiment, the UE 200 may receive a location request from an internal application and determine that an increase in DL-PRS bandwidth, an increased duration of positioning occasions, and/or DL-PRS transmissions from more nearby gNBs may be required to meet a QoS requirement from the application. In an example, the UE 200 may send an MO-LR Request message included in an UL NAS TRANSPORT message to a serving AMF 115 including a request for the increased DL-PRS transmissions. The request may include the DL-PRS capabilities of the UE 200 and parameters for preferred DL-PRS configurations (e.g., a preferred DL-PRS bandwidth, a preferred duration of DL-PRS positioning occasions, preferred DL-PRS beam directions, and a preferred number of nearby gNBs, etc.). The requested DL-PRS configuration parameter may be provided in a LPP Request Assistance Data message included in the MO-LR Request. In an example, the request for increased DL-PRS transmission may also include a Quality of Service (QoS) indicator, such as required accuracy of the location estimate and/or a response time indicating when the internal client requires the location estimate. The MO-LR Request message may also include a time duration for how long the requested DL-PRS configuration is required at the UE 200. The MO-LR Request may also include RSRP measurements (e.g., per beam) of DL signals received by the UE 200 (e.g., an E-CID Location Measurement Report) to assist a LMF 120 in determining nearby gNBs and/or beam directions for DL-PRS.

In another embodiment, the UE 200 may be configured to send a RRC Dedicated SIB Request message to a serving gNB to request on-demand DL-PRS (e.g., a request for increased DL-PRS transmission). The request may include the DL-PRS capabilities of the UE 200 and the parameters for preferred DL-PRS configurations (e.g., a preferred DL-PRS bandwidth, a preferred duration of DL-PRS positioning occasions, a preferred DL-PRS beam directions for certain gNBs, a preferred number of nearby gNBs, etc.). The request may also include a QoS indicator, such as required accuracy of the location estimate and/or a response time indicating when the internal client requires the location estimate. The RRC Dedicated SIB Request message may also include a time duration for how long the requested DL-PRS configuration is required at the UE (e.g., number of seconds or minutes for which the DL-PRS configuration is required). The RRC Dedicated SIB Request message may also include RSRP measurements (e.g., per beam) of DL signals received by the UE 200 (e.g., a RRC Measurement Report) to assist an LMF 120 in determining nearby gNBs and/or beam directions for DL-PRS.

In an embodiment, the request for downlink positioning reference signals may be provided to the LMF 120 from the AMF 115, a previously serving AMF, a previously serving LMF, and/or a previously serving TRP 300 such as the gNB 110*a*. For example, there may be a hand off between serving cells (e.g., serving TRPs) and the request for downlink positioning reference signals may be a persistent request for a particular duration.

At stage 1204, the method includes receiving assistance data based on the positioning reference signal configuration information. The UE 200 is a means for receiving the assistance data. In an embodiment, a network server, such as the LMF 120, may be configured to determine a new DL-PRS configuration for nearby gNBs based at least on part on the PRS configuration information received at stage 1202. The determination may also be based on DL-PRS requests received from other UEs and/or on location procedures for other UEs which occur at about the same time. The new DL-PRS configuration may use increased DL-PRS bandwidth, a longer duration of DL-PRS positioning occasions, DL-PRS transmission on new frequencies, and/or a higher frequency of DL-PRS positioning occasions. In an example, the new DL-PRS configuration may be selected from a set of one or more preconfigured sets of DL-PRS configuration parameters, such as the PRS resources in the positioning frequency layer 700. In networks with beamformed DL-PRS, the LMF 120 may determine directional DL-PRS beams for different gNBs which may be received by the UE 200. The directional DL-PRS beams may be selected by the LMF 120 according to a known approximate location for the UE 200, e.g. as given by the coverage area of the serving or camped-on cell for the UE 105 and/or the RSRP/ECID measurements provided by the UE 200 at stage 1202.

In an embodiment, the LMF 120 may be configured to send a NRPPa Assistance Information Control message to a serving gNB 110a to provide the new DL-PRS configurations. The DL-PRS configuration information may be provided in form of a posSIB (i.e., using the parameter and encoding as defined for broadcast assistance data). The serving gNB 110a may be configured to provide the DL-PRS configuration information to the UE 200 in a dedicated (uni-cast) RRC Reconfiguration message. The dedicatedPosSysInfoDelivery may consist of an OCTET STRING containing the DL-PRS configuration in posSIB format.

At stage 1206, the method includes measuring one or more downlink positioning reference signals based at least in part on the downlink positioning reference signals configuration information. The UE 200 is a means for measuring one or more downlink positioning reference signals. The UE 200 is configured to acquire and measures the DL-PRS transmitted by the gNBs 110a-c according to the DL-PRS configurations provided in the assistance data received at stage 1204. For example, and not a limitation, the UE 200 may obtain RSTD measurements based on the DL-PRS transmissions. The UE 200 may be configured to obtain other measurements based on the DL-PRS transmission.

At stage 1208, the method includes determining a location (e.g. a location of the UE) based at least in part on the measurements obtained from the one or more downlink positioning reference signals and the assistance data. The UE 200 is an example means for determining a location. The UE 200 is configured to determine a location based on the DL-PRS measurements obtained at stage 1206 and the assistance data received at stage 1204. For example, the UE 200 may utilize the RSTD measurements to determine the ranges to multiple gNBs, and the locations of the gNBs to determine a current location. Other known positioning technique such as OTDOA, AoD, multi-RTT, and ECID may also be used to determine the location of the UE 200.

Figure 13:
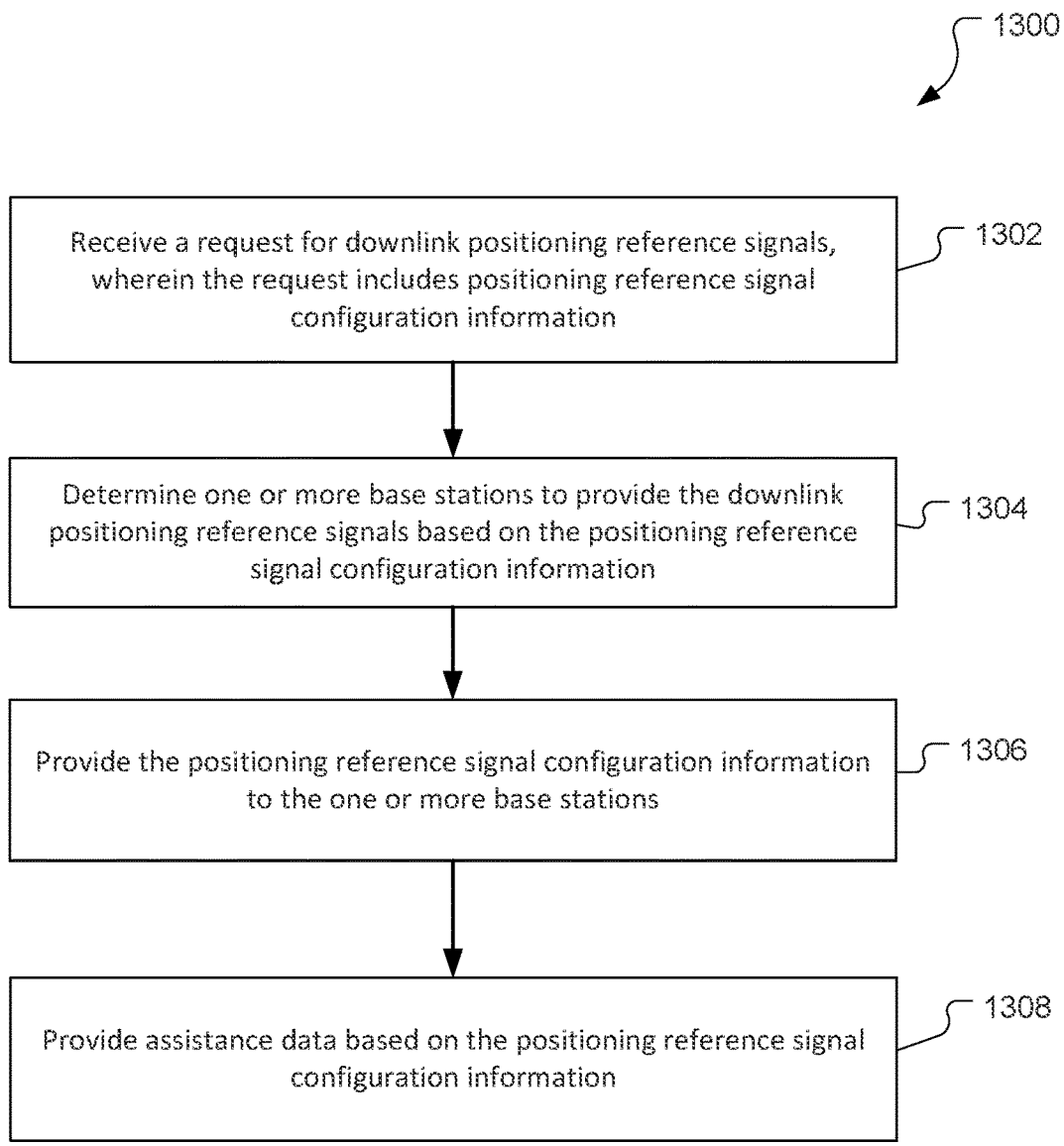
FIG. 13 is a process flow for an example method for providing assistance data for on-demand positioning reference signals.

Referring to FIG. 13, with further reference to FIGS. 1-11B, a method 1300 for providing assistance data for on-demand positioning reference signals includes the stages shown. The method 1300 is, however, an example and not limiting. The method 1300 may be altered, e.g., by having stages added, removed, rearranged, combined, performed concurrently, and/or having single stages split into multiple stages. The method 1300 may be performed by a server or a location server (e.g. the LMF 120 in FIG. 1 or the server 400 in FIG. 4).

At stage 1302, the method includes receiving a request for downlink positioning reference signals (e.g. sent by a UE such as a UE 105), wherein the request includes positioning reference signal configuration information. A server 400, such as the LMF 120, is a means for receiving a request for DL-PRS. In an embodiment, a UE 200 may be configured to send an MO-LR Request message included in an UL NAS TRANSPORT message to a serving AMF 115 including a request for the increased DL-PRS transmissions. The request may include configuration information such as the DL-PRS capabilities of the UE 200 and parameters for preferred DL-PRS configurations (e.g., a preferred DL-PRS bandwidth, a preferred duration of DL-PRS positioning occasions, preferred DL-PRS beam directions, and a preferred number of nearby gNBs. The requested DL-PRS configuration parameter may be provided in a LPP Request Assistance Data message included in the MO-LR Request. In an example, the request for increased DL-PRS transmission may also include a Quality of Service (QoS) indicator, such as required accuracy of the location estimate and/or a response time indicating when the internal client requires the location estimate. The MO-LR Request message may also include a time duration for how long the requested DL-PRS configuration is required at the UE 200. The MO-LR Request may also include RSRP measurements (e.g., per beam) of DL signals received by the UE 200 (e.g., an E-CID Location Measurement Report) to assist a LMF 120 in determining nearby gNBs and/or beam directions for DL-PRS. An AMF 115 may invoke the Nlmf_Location_DetermineLocation service operation towards the LMF 120. The service operation may include the MO-LR Request received from the UE 200.

In an embodiment, serving gNB 110a is configured to sends a NRPPa Assistance Information Feedback message to the LMF 120. The message may include DL-PRS configuration information the gNB 110a received from the UE 105 via a RRC dedicated SIB request.

At stage 1304, the method includes determining one or more base stations to provide the downlink positioning reference signals based on the positioning reference signal configuration information. The server 400 is a means for determining the one or more base stations. In an embodiment, the LMF 120 may be configured to determine a new DL-PRS configuration for nearby base stations (e.g., gNBs) based at least in part on the configuration information. For example, the new DL-PRS configuration for each base station may use increased DL-PRS bandwidth, a longer duration of DL-PRS positioning occasions, DL-PRS transmission on new frequencies, and/or a higher frequency of DL-PRS positioning occasions. In an example, the new DL-PRS configuration may be selected from a set of one or more preconfigured sets of DL-PRS configuration parameters, such as the PRS resources in the positioning frequency layer 700. In networks with beamformed DL-PRS, the LMF 120 may determine directional DL-PRS beams for each base station which should be received by the UE 105. The directional DL-PRS beams may be selected by the LMF 120 according to a known approximate location for the target UE 105, e.g. as given by the coverage area of the serving or camped-on cell for the UE 105 and/or the RSRP/ECID measurements provided in the request for DL-PRS received at stage 1302.

At stage 1306, the method includes providing the positioning reference signal configuration information to the one or more base stations. The server 400 is a means for providing the DL-PRS configuration information. In an example, the LMF 120 is configured to send an NRPPa PRS Configuration Request message to each of the base stations determined at stage 1304 which includes the new DL-PRS configuration determined for that base station. The request may also include a start time for each new DL-PRS configuration and a duration (e.g., as provided in the request received at stage 1302, or as determined by the LMF 120).

At stage 1308, the method includes providing assistance data based on the positioning reference configuration information. The server 400 is a means for providing the assistance data. In an embodiment, the LMF 120 may be configured to send an LPP Provide Assistance Data message to the target UE 105 to provide the new DL-PRS configurations. In another embodiment, the LMF 120 may be configured the to send a NRPPa Assistance Information Control message to a serving base station to provide the new DL-PRS configurations. The DL-PRS configuration information may be provided in form of a posSIB (i.e., using the parameter and encoding as defined for broadcast assistance data). The serving base station may be configured to provide the DL-PRS configuration information to the UE 105 in a dedicated (uni-cast) RRC Reconfiguration message. The dedicatedPosSysInfoDelivery may consist of an OCTET STRING containing the DL-PRS configuration in posSIB format as received.

Figure 14:
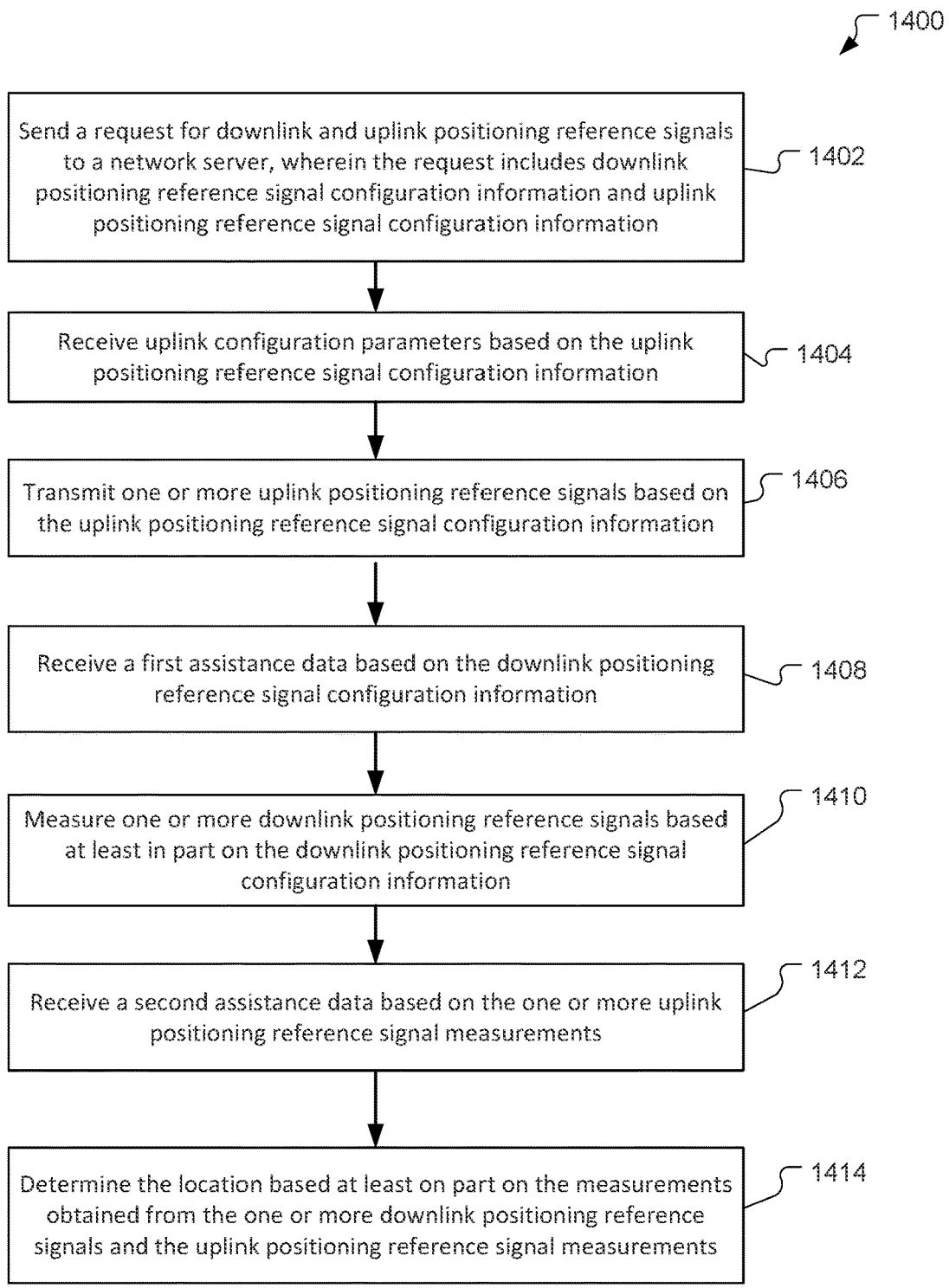
FIG. 14 is a process flow for an example method for determining a location of a mobile device with on-demand downlink and uplink positioning reference signals.

Referring to FIG. 14, with further reference to FIGS. 1-11B, a method 1400 for determining a location of a mobile device with on-demand downlink and uplink positioning reference signals includes the stages shown. The method 1400 is, however, an example and not limiting. The method 1400 may be altered, e.g., by having stages added, removed, rearranged, combined, performed concurrently, and/or having single stages split into multiple stages. The method 1400 may be performed by a UE such as the UE 105 in FIG. 1 or the UE 200 in FIG. 2.

At stage 1402, the method includes sending a request for downlink and uplink positioning reference signals to a network server, wherein the request includes downlink positioning reference signal configuration information and uplink positioning reference signal configuration information. The UE 200 is a means for sending (e.g., transmitting) a request for DL-PRS and UL-PRS. In an embodiment, the UE 200 may be configured to send a MO-LR Request message included in an UL NAS TRANSPORT message to the serving AMF 115 including a request for increased DL-PRS transmission and UL-PRS configuration. The request may include the DL-PRS and UL-PRS capabilities of the UE 105 and parameters for preferred DL-PRS and UL-PRS configurations (e.g., a preferred PRS bandwidth, a preferred duration of PRS positioning occasions, preferred PRS beam directions and a preferred number of nearby gNBs 110a-c to which this applies). The requested DL-PRS and UL-PRS configuration parameters may be provided in a LPP Request Assistance Data message included in the MO-LR Request. The request for increased PRS transmission may also include a QoS indicator, such as required accuracy of the location estimate and/or a response time indicating when the internal client requires the location estimate. The MO-LR Request message may also include a time duration for how long the requested PRS configurations are required at the UE 200 (e.g., number of seconds or minutes for which the DL-PRS and UL-PRS configurations are required). The MO-LR Request may also include RSRP measurements (e.g., per beam) of DL signals received by the UE (e.g., an E-CID Location Measurement Report) to assist an LMF in determining nearby gNBs and/or beam directions for PRS.

In an embodiment, the UE 105 may be configured to send a RRC Dedicated SIB Request message to a serving gNB to request on-demand DL-PRS transmission and UL-PRS configuration. The request may include the DL-PRS and UL-PRS capabilities of the UE and parameters for preferred DL-PRS and UL-PRS configurations as previously described. The RRC Dedicated SIB Request message may also include a time duration for how long the requested PRS configurations are required at the UE 105 (e.g., number of seconds or minutes for which the DL-PRS and UL-PRS configurations are required). The RRC Dedicated SIB Request message may also include RSRP measurements (e.g., per beam) of DL signals received by the UE 105 (e.g., a RRC Measurement Report) to assist an LMF 120 in determining nearby gNBs and/or beam directions for PRS.

At stage 1404, the method includes receiving uplink configuration parameters based on the uplink positioning reference signal configuration information. The UE 200 is a means for receiving the UL-PRS configuration parameters. In an example, a serving gNB of the UE 200 may provide the UL-PRS configuration parameters to the UE 105 in an Radio Resource Control (RRC) message. In another example, the LMF 120 may be configured to send a LPP Provide Assistance Data message to the UE 200 to provide the UL-PRS configuration parameters. In another example, the LMF 120 may be configured to send a NRPPa Assistance Information Control message to a serving gNB for the UE 200 to provide the UL-PRS configuration parameters. The UL-PRS configuration parameters may be provided in form of a posSIB (i.e., using the parameter and encoding as defined for broadcast assistance data). The serving gNB may provide the UL-PRS configuration parameters to the UE 200 in a dedicated (uni-cast) RRC Reconfiguration message. The dedicatedPosSysInfoDelivery may consist of an OCTET STRING containing the UL-PRS configuration parameters.

At stage 1406, the method includes transmitting one or more uplink positioning reference signals based on the uplink positioning reference signal configuration information provided at stage 1402 and received at stage 1404. The UE 200 is a means for transmitting the UL-PRS. In an example, the serving gNB may send a MAC CE (or other information elements provided encapsulated or unencapsulated in Layer 1 (i.e., the physical layer) or Layer 2 (i.e., the MAC layer)) to the UE 105 to activate the UL-PRS. The UE 200 is configured to transmit the UL-PRS based on the MAC-CE.

At stage 1408, the method includes receiving a first assistance data based on the downlink positioning reference signal configuration information and the one or more uplink positioning reference signals. The UE 200 is a means for receiving the first assistance data. In an embodiment, the LMF 120 is configured to send a LPP Provide Assistance Data message to the UE 200 to provide DL-PRS configurations based on the DL-PRS configuration information provided at stage 1402. In another embodiment, the LMF 120 may be configured to send a NRPPa Assistance Information Control message to a serving gNB to provide the DL-PRS configurations based on the DL-PRS configuration information provided at stage 1402. The DL-PRS configuration information may be provided in form of a posSIB (i.e., using the parameter and encoding as defined for broadcast assistance data). In an example, the serving gNB may provide the DL-PRS configuration information to the UE in a dedicated (uni-cast) RRC Reconfiguration message. The dedicatedPosSysInfoDelivery may consist of an OCTET STRING containing the DL-PRS configuration in posSIB format.

At stage 1410, the method includes measuring one or more downlink positioning reference signals based at least in part on the positioning reference signal configuration information. The UE 200 is a means for measuring the one or more DL-PRS. The UE 200 is configured to acquire and measures the DL-PRS transmitted by the gNBs 110*a-c* according to the DL-PRS configurations provided in the assistance data received at stage 1408. For example, and not a limitation, the UE 200 may obtain UE receive (Rx) minus transmit (Tx) Time Difference measurements based on the DL-PRS reception and UL-PRS transmissions. The UE 200 may be configured to obtain other measurements based on the DL-PRS and/or UL-PRS transmissions.

At stage 1412, the method includes receiving a second assistance data based on the one or more uplink positioning reference signal measurements. The UE 200 is a means for receiving the second assistance data. In an example, LMF 120 is also configured to forward UL-PRS measurements received from base stations as the second assistance data (i.e., based on the UL-PRS transmitted by the UE 200 at stage 1406) to the UE 200 in a LPP Provide Assistance Data message. The UL-PRS measurements may be gNB Rx-Tx Time Difference measurements.

At stage 1414, the method includes determining the location based at least on part on the measurements obtained from the one or more downlink positioning reference signals and the uplink positioning reference signal measurements. The UE 200 is an example means for determining a location. The UE 200 is configured to determine a location based on the DL-PRS measurements obtained at stage 1206 and UL-PRS measurements and assistance data received at stage 1412. For example, the UE 200 may utilize the UE Rx-Tx Time Difference measurements and gNB Rx-Tx Time Difference measurements to determine the ranges to multiple gNBs, and the locations of the gNBs to determine a current location using a multi RTT positioning technique. Other known positioning technique such as OTDOA, AoD, and ECID may also be used to determine the location of the UE 200.

Figure 15:
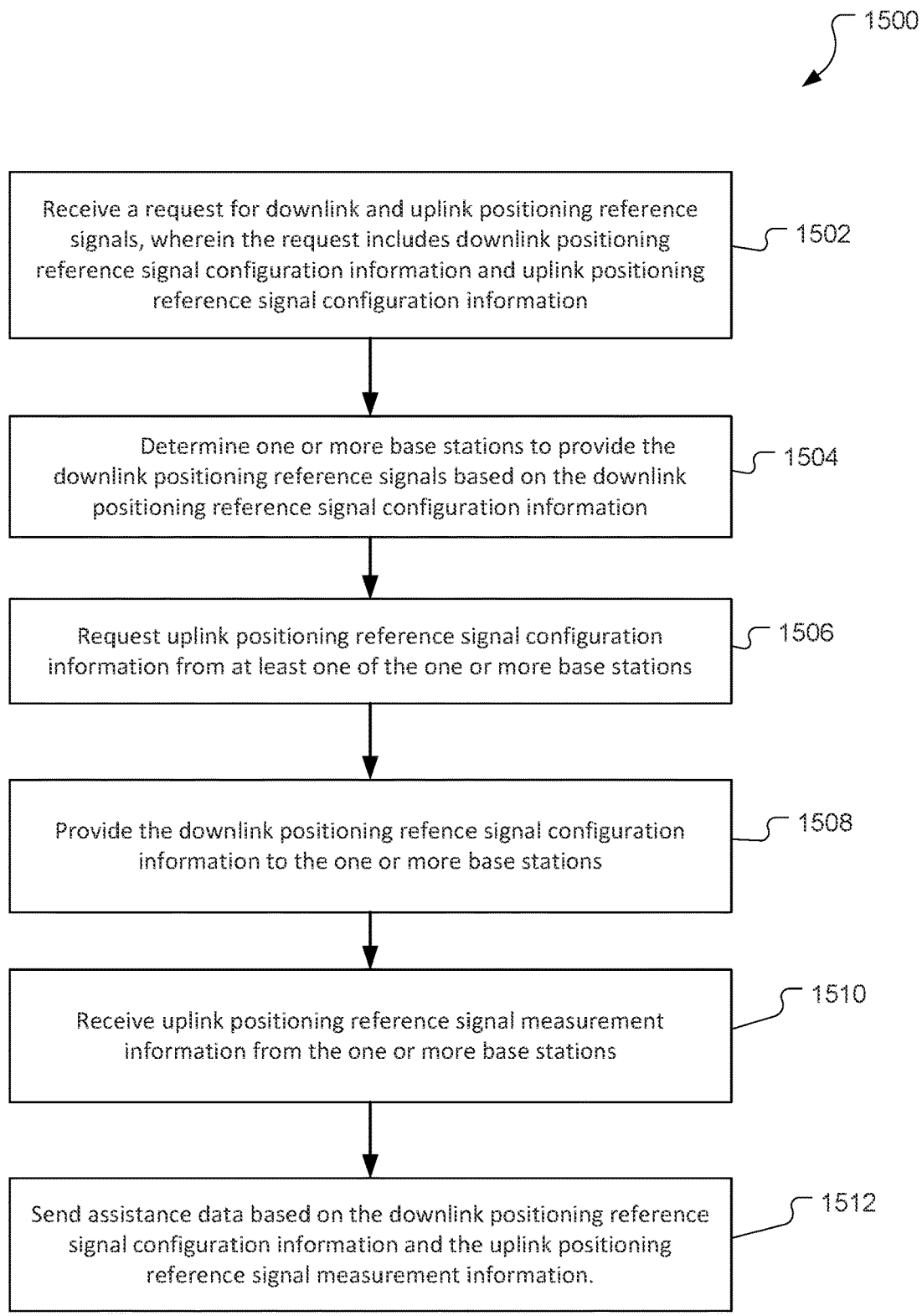
FIG. 15 is a process flow for an example method for providing assistance data for on-demand downlink and uplink positioning reference signals.

Referring to FIG. 15, with further reference to FIGS. 1-11B, a method 1500 for providing assistance data for on-demand downlink and uplink positioning reference signals includes the stages shown. The method 1500 is, however, an example and not limiting. The method 1500 may be altered, e.g., by having stages added, removed, rearranged, combined, performed concurrently, and/or having single stages split into multiple stages. The method 1500 may be performed by a server or a location server (e.g. the LMF 120 in FIG. 1 or the server 400 in FIG. 4).

At stage 1502, the method includes receiving a request for downlink and uplink positioning reference signals, wherein the request includes downlink positioning reference signal configuration information and uplink positioning reference signal configuration information. A server 400, such as the LMF 120, is a means for receiving a DL-PRS and UL-PRS request. In an embodiment, a UE 200 may be configured to send an MO-LR Request message included in an UL NAS TRANSPORT message to a serving AMF 115 including a request for the increased DL-PRS transmissions and UL-PRS configuration information. The request may include configuration information such as the DL-PRS and UL-PRS capabilities of the UE 200 and parameters for preferred DL-PRS and UL-PRS configurations (e.g., a preferred DL-PRS bandwidth, a preferred duration of DL-PRS positioning occasions, preferred DL-PRS beam directions, and a preferred number of nearby gNBs, etc.). The requested DL-PRS and UL-PRS configuration parameters may be provided in a LPP Request Assistance Data message included in the MO-LR Request. In an example, the request for increased DL-PRS transmission may also include a Quality of Service (QoS) indicator, such as a required accuracy of the location estimate and/or a response time indicating when the internal client requires the location estimate. The MO-LR Request message may also include a time duration for how long the requested PRS configurations are required at the UE 200. The MO-LR Request may also include RSRP measurements (e.g., per beam) of DL signals received by the UE 200 (e.g., an E-CID Location Measurement Report) to assist a LMF 120 in determining nearby gNBs and/or beam directions for DL-PRS. An AMF 115 may invoke the Nlmf_Location_DetermineLocation service operation towards the LMF 120. The service operation may include the MO-LR Request received from the UE 200.

In an embodiment, serving gNB 110*a* is configured to sends a NRPPa Assistance Information Feedback message to the LMF 120. The message may include DL-PRS and UL-PRS configuration information the gNB 110*a* received from the UE 105 via a RRC dedicated SIB request.

At stage 1504, the method includes determining one or more base stations to provide the downlink positioning reference signals based on the downlink positioning reference signal configuration information. The server 400 is a means for determining the one or more base stations. In an embodiment, the LMF 120 may be configured to determine a new DL-PRS configuration for nearby base stations (e.g., gNBs) based at least in part on the configuration information. For example, the new DL-PRS configuration for each base station may use increased DL-PRS bandwidth, a longer duration of DL-PRS positioning occasions, DL-PRS transmission on new frequencies, and/or a higher frequency of DL-PRS positioning occasions. In an example, the new DL-PRS configuration may be selected from a set of one or more preconfigured sets of DL-PRS configuration parameters, such as the PRS resources in the positioning frequency layer 700. In networks with beamformed DL-PRS, the LMF 120 may determine directional DL-PRS beams for each base station which should be received by the UE 105. The directional DL-PRS beams may be selected by the LMF 120 according to a known approximate location for the target UE 105, e.g. as given by the coverage area of the serving or camped-on cell for the UE 105 and/or the RSRP/ECID measurements provided in the request for DL-PRS received at stage 1502.

At stage 1506, the method includes requesting uplink positioning reference signal configuration information based on the received request for UL-PRS at stage 1502 from at least one of the one or more base stations. The server 400 is a means for requesting the UL-PRS configuration information. In an example, the LMF 120 is configured to send a NRPPa Measurement Request message to at least one of the one or more base stations determined at stage 1504 to request UL-PRS measurements (e.g., gNB Rx-Tx Time Difference Measurements).

At stage 1508, the method includes providing the downlink positioning reference signal configuration information to the one or more base stations. The server 400 is a means for providing the DL-PRS configuration information. In an example, the LMF 120 is configured to send an NRPPa PRS Configuration Request message to each of the base stations determined at stage 1504 which includes the new DL-PRS configuration determined for that base station. The request may also include a start time for each new DL-PRS configuration and a duration (e.g., as provided in the request received at stage 1502, or as determined by the LMF 120).

At stage 1510, the method includes receiving uplink positioning reference signal measurement information from the one or more base stations; e.g., from the one or more base stations determined at stage 1504. The server 400 is a means for receiving the UL-PRS measurements. The base stations (e.g., gNBs 110*a-c*) are configured to acquire and measure the UL-PRS transmitted by the UE 200. In an example, the LMF 120 may determine the start time for switching to the new DL-PRS configuration and for activation of UL-PRS transmission. The base stations are configured to provide the resulting UL-PRS measurements to the LMF 120.

At stage 1512, the method includes sending assistance data based on the downlink positioning reference signal configuration information and the uplink positioning reference signal measurement information. The server 400 is a means for sending (e.g., transmitting) the assistance data. In an embodiment, the LMF 120 may be configured to send an LPP Provide Assistance Data message to the target UE 105 to provide the new DL-PRS configurations. The LMF 120 is also configured to forward the UL-PRS measurements at stage 1510 to the target UE 105 in a LPP Provide Assistance Data message.

In another embodiment, the LMF 120 may be configured to send a NRPPa Assistance Information Control message to a serving base station to provide the new DL-PRS configurations. The DL-PRS configuration information may be provided in the form of a posSIB (i.e., using the parameter and encoding as defined for broadcast assistance data). The serving base station may be configured to provide the DL-PRS configuration information to the UE 105 in a dedicated (uni-cast) RRC Reconfiguration message. The dedicatedPosSysInfoDelivery may consist of an OCTET STRING containing the DL-PRS configuration in posSIB format as received. The LMF 120 may forward the UL-PRS measurements at stage 1510 to the target UE 105 in a LPP Provide Assistance Data message.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Components, functional or otherwise, shown in the figures and/or discussed herein as being connected or communicating with each other are communicatively coupled unless otherwise noted. That is, they may be directly or indirectly connected to enable communication between them.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A method for determining a location of a mobile device, comprising:
   sending, from the mobile device to a network server, a request for downlink positioning reference signals that includes on-demand positioning reference signal configuration information comprising at least one of:
   a start time for on-demand positioning reference signal, or
   a duration for on-demand positioning reference signal;
   receiving assistance data based, at least in part, on the on-demand positioning reference signal configuration information; and
   determining location information based, at least in part, on one or more downlink positioning reference signals associated with the on-demand positioning reference signal configuration information and the assistance data.

2. The method of claim 1 wherein the request for the downlink positioning reference signals is a Mobile-Originated Location Request (MO-LR).

3. The method of claim 1 wherein the request for the downlink positioning reference signals is a Radio Resource Control (RRC) Dedicated System Information Block (SIB) request.

4. The method of claim 1 wherein the positioning reference signal configuration information includes at least one of a quality of service indicator, a time duration indicating how long the requested downlink positioning reference signals are required by the mobile device, and Reference Signal Received Power (RSRP) measurements of downlink signals received by the mobile device.

5. The method of claim 1 further comprising receiving a Mobile-Originated Location Request (MO-LR) response message indicating a time start and a duration for the one or more downlink positioning reference signals.

6. The method of claim 1 wherein receiving the assistance data includes receiving a Radio Resource Control (RRC) Reconfiguration message.

7. The method of claim 1 wherein receiving the assistance data includes receiving a LPP Provide Assistance Data message.

8. The method of claim 7 wherein the LPP Provide Assistance Data message includes a time start and a duration for the one or more downlink positioning reference signals.

9. The method of claim 1 wherein the positioning reference signal configuration information is associated with one or more positioning reference signal resources in a positioning frequency layer.

10. A method for providing location information to a mobile device, comprising:
    receiving, from the mobile device, a request for downlink positioning reference signals that includes on-demand positioning reference signal configuration information comprising at least one of:
    a start time for on-demand positioning reference signal, or
    a duration for on-demand positioning reference signal;
    determining one or more base stations to provide the downlink positioning reference signals based, at least in part, on the on-demand positioning reference signal configuration information;
    providing the on-demand positioning reference signal configuration information to the one or more base stations; and
    providing assistance data based, at least in part, on the on-demand positioning reference signal configuration information.

11. The method of claim 10 wherein the request for the downlink positioning reference signals is based on a Mobile-Originated Location Request (MO-LR) received by a network server.

12. The method of claim 10 wherein the request for the downlink positioning reference signals is based on a Radio Resource Control (RRC) Dedicated System Information Block (SIB) request received by a network base station.

13. The method of claim 10 wherein the positioning reference signal configuration information includes at least one of a quality of service indicator, a time duration indicating how long the requested downlink positioning reference signals are required by the mobile device, and RSRP measurements of downlink signals received by the mobile device.

14. The method of claim 10 further comprising providing a response message indicating a time start and a duration for the one or more downlink positioning reference signals.

15. The method of claim 10 wherein the determining one or more base stations to provide the downlink positioning reference signals includes selecting one or more positioning reference signal resources from a positioning frequency layer.

16. The method of claim 10 wherein the determining one or more base stations to provide the downlink positioning reference signals includes selecting one or more downlink positioning reference signal beams based on an approximate location of the mobile device.

17. The method of claim 16 wherein the approximate location of the mobile device is based on at least one of a coverage area of a serving cell for the mobile device, Reference Signal Received Power (RSRP) measurements of downlink signals received by the mobile device, and Enhanced Cell Identification (ECID) measurements of downlink signals received by the mobile device.

18. The method of claim 10 wherein providing the assistance data includes sending a LPP Provide Assistance Data message to the mobile device.

19. The method of claim 18 wherein the LPP Provide Assistance Data message includes a time start and a duration for the one or more downlink positioning reference signals.

20. The method of claim 10 wherein providing the assistance data includes sending a NRPPa Assistance Information Control message to a serving base station of the mobile device.

21. The method of claim 20 wherein the NRPPa Assistance Information Control message includes a time start and a duration for the one or more downlink positioning reference signals.

22. A method for determining a location of a mobile device, comprising:
   sending, from the mobile device to a network server, a request for downlink and uplink positioning reference signals that includes on-demand downlink positioning reference signal configuration information and uplink positioning reference signal configuration information comprising at least one of:
      a start time for on-demand downlink positioning reference signal, or
      a duration for on-demand downlink positioning reference signal;
   receiving uplink configuration parameters based on the uplink positioning reference signal configuration information;
   transmitting one or more uplink positioning reference signals based on the uplink positioning reference signal configuration information;
   receiving a first assistance data based, at least in part, on the on-demand downlink positioning reference signal configuration information;
   receiving a second assistance data based on uplink positioning reference signal measurements; and
   determining location information based, at least in part, on the measurements obtained from the one or more downlink positioning reference signals associated with the on-demand downlink positioning reference signal configuration information and the uplink positioning reference signal measurements.

23. The method of claim 22 wherein the request for downlink and uplink positioning reference signals is a Mobile-Originated Location Request (MO-LR).

24. The method of claim 22 wherein the request for downlink and uplink positioning reference signals is a Radio Resource Control (RRC) Dedicated System Information Block (SIB) request.

25. The method of claim 22 wherein the downlink positioning reference signal configuration information or the uplink positioning reference signal configuration information includes at least one of a quality of service indicator, a time duration indicating how long the requested downlink and uplink positioning reference signals are required by the mobile device, and Reference Signal Received Power (RSRP) measurements of downlink signals received by the mobile device.

26. The method of claim 22 further comprising receiving a Mobile-Originated Location Request (MO-LR) response message indicating a time start and a duration for the one or more downlink positioning reference signals.

27. The method of claim 22 wherein receiving the uplink configuration parameters includes receiving a Radio Resource Control (RRC) message including the uplink configuration parameters.

28. The method of claim 22 further comprising receiving an uplink activation message, wherein transmitting the one or more uplink positioning reference signals is in response to receiving the uplink activation message.

29. The method of claim 28 wherein the uplink activation message is a Medium Access Control Control Element (MAC-CE).

30. The method of claim 22 wherein the uplink positioning reference signal measurements are gNB Rx-Tx Time Difference measurements.

31. The method of claim 22 wherein receiving the first assistance data includes receiving a Radio Resource Control (RRC) Reconfiguration message.

32. The method of claim 22 wherein receiving the first assistance data includes receiving a LPP Provide Assistance Data message.

33. The method of claim 32 wherein the LPP Provide Assistance Data message includes a time start and a duration for the one or more downlink positioning reference signals.

34. The method of claim 22 wherein receiving the second assistance data includes receiving a LPP Provide Assistance Data message.

35. The method of claim 22 wherein the downlink positioning reference signal configuration information is associated with one or more positioning reference signal resources in a positioning frequency layer.

36. A method for providing location information to a mobile device, comprising:
   receiving, from the mobile device, a request for downlink and uplink positioning reference signals that includes on-demand downlink positioning reference signal configuration information and uplink positioning reference signal configuration information comprising at least one of:
      a start time for on-demand positioning reference signal, or
      a duration for on-demand positioning reference signal;
   determining one or more base stations to provide downlink positioning reference signals based, at least in part, on the on-demand downlink positioning reference signal configuration information;

requesting uplink positioning reference signal configuration information from at least one of the one or more base stations;

providing the on-demand downlink positioning reference signal configuration information to the one or more base stations;

receiving uplink positioning reference signal measurement information from the one or more base stations; and sending assistance data based, at least in part, on the on-demand downlink positioning reference signal configuration information and the uplink positioning reference signal measurement information.

37. The method of claim 36 wherein the request for the downlink positioning reference signals is based on a Mobile-Originated Location Request (MO-LR) received by a network server.

38. The method of claim 36 wherein the request for the downlink positioning reference signals is based on a Radio Resource Control (RRC) Dedicated System Information Block (SIB) request received by a network base station.

39. The method of claim 36 wherein the downlink positioning reference signal configuration information or the uplink positioning reference signal configuration information includes at least one of a quality of service indicator, a time duration indicating how long the requested downlink and uplink positioning reference signals are required by the mobile device, and Reference Signal Received Power (RSRP) measurements of downlink signals received by the mobile device.

40. The method of claim 36 further comprising providing a response message indicating a time start and a duration for the one or more downlink positioning reference signals.

41. The method of claim 36 wherein the determining one or more base stations to provide the downlink positioning reference signals includes selecting one or more positioning reference signal resources from a positioning frequency layer.

42. The method of claim 36 wherein the determining one or more base stations to provide the downlink positioning reference signals includes selecting one or more downlink positioning reference signal beams based on an approximate location of the mobile device.

43. The method of claim 42 wherein the approximate location of the mobile device is based on at least one of a coverage area of a serving cell for the mobile device, Reference Signal Received Power (RSRP) measurements of downlink signals received by the mobile device, and Enhanced Cell Identification (ECID) measurements of downlink signals received by the mobile device.

44. The method of claim 36 wherein providing the assistance data includes sending a LPP Provide Assistance Data message to the mobile device.

45. The method of claim 36 wherein providing the assistance data includes sending a NRPPa Assistance Information Control message to a serving base station of the mobile device.

46. A mobile device, comprising:
a memory;
at least one transceiver;
at least one processor communicatively coupled to the memory and the at least one transceiver and configured to:
transmit, via the at least one transceiver of the mobile device to a network server, a request for downlink positioning reference signals that includes on-demand positioning reference signal configuration information comprising at least one of:
a start time for on-demand positioning reference signal, or
a duration for on-demand positioning reference signal;
receive, via the at least one transceiver, assistance data based, at least in part, on positioning reference signal configuration information; and
determine location information based, at least in part, on one or more downlink positioning reference signals associated with the on-demand positioning reference signal configuration information and the assistance data.

47. The mobile device of claim 46 wherein the request for the downlink positioning reference signals is a Mobile-Originated Location Request (MOLR).

48. The mobile device of claim 46 wherein the request for the downlink positioning reference signals is a Radio Resource Control (RRC) Dedicated System Information Block (SIB) request.

49. The mobile device of claim 46 wherein the positioning reference signal configuration information includes at least one of a quality of service indicator, a time duration indicating how long the requested downlink positioning reference signals are required by a mobile device, and Reference Signal Received Power (RSRP) measurements of downlink signals received by the mobile device.

50. The mobile device of claim 46 wherein the at least one processor is further configured to receive a Mobile-Originated Location Request (MO-LR) response message indicating a time start and a duration for the one or more downlink positioning reference signals.

51. The mobile device of claim 46 wherein the at least one processor is configured to receive a Radio Resource Control (RRC) Reconfiguration message.

52. The mobile device of claim 46 wherein the at least one processor is configured to receive a LPP Provide Assistance Data message.

53. The mobile device of claim 46 wherein the positioning reference signal configuration information is associated with one or more positioning reference signal resources in a positioning frequency layer.

54. An apparatus, comprising:
a memory;
at least one transceiver; and
at least one processor communicatively coupled to the memory and the at least one transceiver and configured to:
receive, via the at least one transceiver from a mobile device, a request for downlink positioning reference signals, wherein the request includes on-demand positioning reference signal configuration information comprising at least one of:
a start time for on-demand positioning reference signal, or
a duration for on-demand positioning reference signal;
determine one or more base stations to provide the downlink positioning reference signals based, at least in part, on the on-demand positioning reference signal configuration information;
provide the on-demand positioning reference signal configuration information to the one or more base stations; and
provide assistance data based, at least in part, on the on-demand positioning reference signal configuration information.

55. The apparatus of claim 54 wherein the request for the downlink positioning reference signals is based on a Mobile-Originated Location Request (MO-LR) received by a network server.

56. The apparatus of claim 54 wherein the request for the downlink positioning reference signals is based on a Radio Resource Control (RRC) Dedicated System Information Block (SIB) request received by a network base station.

57. The apparatus of claim 54 wherein the positioning reference signal configuration information includes at least one of a quality of service indicator, a time duration indicating how long the requested downlink positioning reference signals are required by a mobile device, and RSRP measurements of downlink signals received by the mobile device.

58. The apparatus of claim 54 wherein the at least one processor is further configured to provide a response message indicating a time start and a duration for the one or more downlink positioning reference signals.

59. The apparatus of claim 54 wherein the at least one processor is further configured to select one or more positioning reference signal resources from a positioning frequency layer.

60. The apparatus of claim 54 wherein the at least one processor is further configured to select one or more downlink positioning reference signal beams based on an approximate location of a mobile device.

61. The apparatus of claim 60 wherein the approximate location of the mobile device is based on at least one of a coverage area of a serving cell for the mobile device, Reference Signal Received Power (RSRP) measurements of downlink signals received by the mobile device, and Enhanced Cell Identification (ECID) measurements of downlink signals received by the mobile device.

62. The apparatus of claim 54 wherein the at least one processor is further configured to sending a LPP Provide Assistance Data message to a mobile device.

63. The apparatus of claim 54 wherein the at least one processor is further configured to send a NRPPa Assistance Information Control message to a serving base station of a mobile device.

64. A mobile device, comprising:
a memory;
at least one transceiver; and
at least one processor communicatively coupled to the memory and the at least one transceiver and configured to:
transmit to a network server, via the at least one transceiver of the mobile device, a request for downlink and uplink positioning reference signals, wherein the request includes on-demand downlink positioning reference signal configuration information and uplink positioning reference signal configuration information, wherein the on-demand downlink positioning reference signal configuration information comprises at least one of:
a start time for on-demand downlink positioning reference signal, or
a duration for on-demand downlink positioning reference signal;
receive, via the at least on transceiver, uplink configuration parameters based on the uplink positioning reference signal configuration information;
transmit one or more uplink positioning reference signals;
receive, via the at least one transceiver, a first assistance data based on the downlink positioning reference signal configuration information;
receive, via the at least one transceiver, a second assistance data based on uplink positioning reference signal measurements; and
determine location information based, at least in part, on the measurements obtained from the one or more downlink positioning reference signals associated with the on-demand downlink positioning reference signal configuration information and the uplink positioning reference signal measurements.

65. The mobile device of claim 64 wherein the request for downlink and uplink positioning reference signals is a Mobile-Originated Location Request (MO-LR).

66. The mobile device of claim 64 wherein the request for downlink and uplink positioning reference signals is a Radio Resource Control (RRC) Dedicated System Information Block (SIB) request.

67. The mobile device of claim 64 wherein the downlink positioning reference signal configuration information or the uplink positioning reference signal configuration information includes at least one of a quality of service indicator, a time duration indicating how long the requested downlink and uplink positioning reference signals are required by a mobile device, and Reference Signal Received Power (RSRP) measurements of downlink signals received by the mobile device.

68. The mobile device of claim 64 wherein the at least one processor is further configured to receive a Mobile-Originated Location Request (MO-LR) response message indicating a time start and a duration for the one or more downlink positioning reference signals.

69. The mobile device of claim 64 wherein the at least one processor is further configured to receive a Radio Resource Control (RRC) message including the uplink configuration parameters.

70. The mobile device of claim 64 wherein the at least one processor is further configured to receive an uplink activation message and transmit the one or more uplink positioning reference signals in response to receiving the uplink activation message.

71. The mobile device of claim 70 wherein the uplink activation message is a Medium Access Control Control Element (MAC-CE).

72. The mobile device of claim 64 wherein the uplink positioning reference signal measurements are gNB Rx-Tx Time Difference measurements.

73. The mobile device of claim 64 wherein the at least one processor is further configured to receive a Radio Resource Control (RRC) Reconfiguration message.

74. The mobile device of claim 64 wherein the at least one processor is further configured to receive a LPP Provide Assistance Data message.

75. The mobile device of claim 64 wherein the downlink positioning reference signal configuration information is associated with one or more positioning reference signal resources in a positioning frequency layer.

76. An apparatus, comprising:
a memory;
at least one transceiver; and
at least one processor communicatively coupled to the memory and the at least one transceiver and configured to:
receive, via the at least one transceiver from a mobile device, a request for on-demand downlink and uplink positioning reference signals that includes downlink positioning reference signal configuration information and uplink positioning reference signal configuration information comprising at least one of:
 a start time for on-demand downlink positioning reference signal, or
 a duration for on-demand downlink positioning reference signal;
determine one or more base stations to provide downlink positioning reference signals based, at least in part, on the on-demand downlink positioning reference signal configuration information;
request uplink positioning reference signal configuration information from at least one of the one or more base stations;
provide the on-demand downlink positioning reference signal configuration information to the one or more base stations;
receive, via the at least one transceiver, uplink positioning reference signal measurement information from the one or more base stations; and
transmit, via the at least one transceiver, assistance data based, at least in part, on the on-demand downlink positioning reference signal configuration information and the uplink positioning reference signal measurement information.

77. The apparatus of claim 76 wherein the request for the downlink positioning reference signals is based on a Mobile-Originated Location Request (MO-LR) received by a network server.

78. The apparatus of claim 76 wherein the request for the downlink positioning reference signals is based on a Radio Resource Control (RRC) Dedicated System Information Block (SIB) request received by a network base station.

79. The apparatus of claim 76 wherein the downlink positioning reference signal configuration information or the uplink positioning reference signal configuration information includes at least one of a quality of service indicator, a time duration indicating how long the requested downlink and uplink positioning reference signals are required by a mobile device, and Reference Signal Received Power (RSRP) measurements of downlink signals received by the mobile device.

80. The apparatus of claim 76 wherein the at least one processor is further configured to provide a response message indicating a time start and a duration for the one or more downlink positioning reference signals.

81. The apparatus of claim 76 wherein the at least one processor is further configured to select one or more positioning reference signal resources from a positioning frequency layer.

82. The apparatus of claim 76 wherein the at least one processor is further configured to select one or more downlink positioning reference signal beams based on an approximate location of a mobile device.

83. The apparatus of claim 82 wherein the approximate location of the mobile device is based on at least one of a coverage area of a serving cell for the mobile device, Reference Signal Received Power (RSRP) measurements of downlink signals received by the mobile device, and Enhanced Cell Identification (ECID) measurements of downlink signals received by the mobile device.

84. The apparatus of claim 76 wherein the at least one processor is further configured send a LPP Provide Assistance Data message to a mobile device.

85. The apparatus of claim 76 wherein the at least one processor is further configured to send a NRPPa Assistance Information Control message to a serving base station of a mobile device.

86. A mobile device for determining a location of the mobile device, comprising:
 means for sending, from the mobile device to a network server, a request for downlink positioning reference signals includes on-demand positioning reference signal configuration information comprising at least one of:
  a start time for on-demand positioning reference signal, or
  a duration for on-demand positioning reference signal;
 means for receiving assistance data based, at least in part, on the on-demand positioning reference signal configuration information; and
 means for determining location information based, at least in part, on one or more downlink positioning reference signals associated with the on-demand positioning reference signal configuration information and the assistance data.

87. An apparatus for providing location information to a mobile device, comprising:
 means for receiving, from the mobile device, a request for downlink positioning reference signals, that includes on-demand positioning reference signal configuration information comprising at least one of:
  a start time for on-demand positioning reference signal, or
  a duration for on-demand positioning reference signal;
 means for determining one or more base stations to provide the downlink positioning reference signals based, at least in part, on the on-demand positioning reference signal configuration information;
 means for providing the on-demand positioning reference signal configuration information to the one or more base stations; and
 means for providing assistance data based, at least in part, on the on-demand positioning reference signal configuration information.

88. A mobile device for determining a location of the mobile device, comprising:
 means for sending, from the mobile device to a network server, a request for downlink and uplink positioning reference signals that includes on-demand downlink positioning reference signal configuration information and uplink positioning reference signal configuration information, wherein the on-demand downlink positioning reference signal configuration information comprises at least one of:
  a start time for on-demand downlink positioning reference signal, or
  a duration for on-demand downlink positioning reference signal;
 means for receiving uplink configuration parameters based on the uplink positioning reference signal configuration information;
 means for transmitting one or more uplink positioning reference signals;
 means for receiving a first assistance data based, at least in part, on the on-demand downlink positioning reference signal configuration information;
 means for receiving a second assistance data based on uplink positioning reference signal measurements; and
 means for determining location information based, at least in part, on the measurements obtained from the one or more downlink positioning reference signals associated with the on-demand downlink positioning reference signal configuration information and the uplink positioning reference signal measurements.

89. An apparatus for providing location information to a mobile device, comprising:
    means for receiving, from the mobile device, a request for downlink and uplink positioning reference signals that includes on-demand downlink positioning reference signal configuration information and uplink positioning reference signal configuration information comprising at least one of:
        a start time for on-demand downlink positioning reference signal, or
        a duration for on-demand downlink positioning reference signal;
    means for determining one or more base stations to provide downlink positioning reference signals, at least in part, on the on-demand downlink positioning reference signal configuration information;
    means for requesting uplink positioning reference signal configuration information from at least one of the one or more base stations;
    means for providing the on-demand downlink positioning reference signal configuration information to the one or more base stations;
    means for receiving uplink positioning reference signal measurement information from the one or more base stations; and
    means for sending assistance data based, at least in part, on the on-demand downlink positioning reference signal configuration information and the uplink positioning reference signal measurement information.

90. A non-transitory processor-readable storage medium comprising processor-readable instructions configured to cause one or more processors to determine a location of a mobile device, comprising:
    code for sending, from the mobile device to a network server, a request for downlink positioning signals that includes on-demand positioning reference signal configuration information comprising at least one of:
        a start time for on-demand positioning reference signal, or
        a duration for on-demand positioning reference signal;
    code for receiving assistance data based, at least in part, on the on-demand positioning reference signal configuration information; and
    code for determining location information based, at least in part, on one or more downlink positioning reference signals associated with the on-demand positioning reference signal configuration information and the assistance data.

91. A non-transitory processor-readable storage medium comprising processor-readable instructions configured to cause one or more processors to provide location information to a mobile device, comprising
    code for receiving, from the mobile device, a request for downlink positioning reference signals that includes on-demand positioning reference signal configuration information comprising at least one of:
        a start time for on-demand positioning reference signal, or
        a duration for on-demand positioning reference signal;
    code for determining one or more base stations to provide the downlink positioning reference signals based, at least in part, on the on-demand positioning reference signal configuration information;
    code for providing the on-demand positioning reference signal configuration information to the one or more base stations; and
    code for providing assistance data based, at least in part, on the on-demand positioning reference signal configuration information.

92. A non-transitory processor-readable storage medium comprising processor-readable instructions configured to cause one or more processors to determine a location of a mobile device, comprising:
    code for sending, from the mobile device to a network server, a request for downlink and uplink positioning reference that includes on-demand downlink positioning reference signal configuration information and uplink positioning reference signal configuration information, wherein the on-demand downlink positioning reference signal configuration information comprises at least one of:
        a start time for on-demand downlink positioning reference signal, or
        a duration for on-demand downlink positioning reference signal;
    code for receiving uplink configuration parameters based on the uplink positioning reference signal configuration information;
    code for transmitting one or more uplink positioning reference signals;
    code for receiving a first assistance data based, at least in part, on the on-demand downlink positioning reference signal configuration information;
    code for receiving a second assistance data based on uplink positioning reference signal measurements; and
    code for determining location information based, at least in part, on the measurements obtained from the one or more downlink positioning reference signals associated with the on-demand downlink positioning reference signal configuration information and the uplink positioning reference signal measurements.

93. A non-transitory processor-readable storage medium comprising processor-readable instructions configured to cause one or more processors to provide location information to a mobile device, comprising:
    code for receiving, from the mobile device, a request for downlink and uplink positioning reference signals that includes on-demand downlink positioning reference signal configuration information and uplink positioning reference signal configuration information, wherein the on-demand downlink positioning reference signal configuration information comprises at least one of:
        a start time for on-demand downlink positioning reference signal, or
        a duration for on-demand downlink positioning reference signal;
    code for determining one or more base stations to provide downlink positioning reference signals based, at least in part, on the on-demand downlink positioning reference signal configuration information;
    code for requesting uplink positioning reference signal configuration information from, at least one of, the one or more base stations;
    code for providing the on-demand downlink positioning reference signal configuration information to the one or more base stations;
    code for receiving uplink positioning reference signal measurement information from the one or more base stations; and code for sending assistance data based, at least in part, on the on-demand downlink positioning reference signal configuration information and the uplink positioning reference signal measurement information.

\* \* \* \* \*